US012471504B1

(12) United States Patent
George et al.

(10) Patent No.: US 12,471,504 B1
(45) Date of Patent: Nov. 11, 2025

(54) TRENCH-BASED QUANTUM DOT DEVICES WITH CONDUCTIVE LINERS

(71) Applicant: Intel Corporation, Santa Clara, CA (US)

(72) Inventors: Hubert C. George, Portland, OR (US); Ravi Pillarisetty, Portland, OR (US); Lester Lampert, Portland, OR (US); James S. Clarke, Portland, OR (US); Nicole K. Thomas, Portland, OR (US); Jeanette M. Roberts, North Plains, OR (US)

(73) Assignee: Intel Corporation, Santa Clara, CA (US)

( * ) Notice: Subject to any disclaimer, the term of this patent is extended or adjusted under 35 U.S.C. 154(b) by 553 days.

(21) Appl. No.: 17/935,617

(22) Filed: Sep. 27, 2022

(51) Int. Cl.
*H10N 60/10* (2023.01)
*G06N 10/40* (2022.01)
*H10N 60/01* (2023.01)

(52) U.S. Cl.
CPC ........... *H10N 60/128* (2023.02); *G06N 10/40* (2022.01); *H10N 60/01* (2023.02); *H10N 60/11* (2023.02)

(58) Field of Classification Search
CPC ...... H10N 60/128; H10N 60/01; H10N 60/11; G06N 10/40; H01L 39/228; H01L 39/221; H01L 39/24
See application file for complete search history.

(56) References Cited

U.S. PATENT DOCUMENTS

| | | |
|---|---|---|
| 633,516 A | 9/1899 | Hunter |
| 1,107,891 A | 8/1914 | Briles |
| 6,333,516 B1 | 12/2001 | Katoh et al. |
| 10,770,545 B2 | 9/2020 | George et al. |
| 10,910,488 B2 | 2/2021 | George et al. |
| 11,063,040 B2 | 7/2021 | Clarke et al. |
| 11,335,778 B2 | 5/2022 | Thomas et al. |
| 2002/0179897 A1 | 12/2002 | Eriksson et al. |
| 2003/0010978 A1 | 1/2003 | Burden |

(Continued)

FOREIGN PATENT DOCUMENTS

| | | |
|---|---|---|
| WO | 2017155531 A1 | 9/2017 |
| WO | 2017213638 A1 | 12/2017 |

(Continued)

OTHER PUBLICATIONS

"A Nanodamascene Process for Advanced Single-Electron Transistor Fabrication," Dubuc et al., IEEE Transactions on Nanotechnology, vol. 7, No. 1, Jan. 2008, pp. 68-73.

(Continued)

*Primary Examiner* — William B Partridge
*Assistant Examiner* — David Paul Sedorook
(74) *Attorney, Agent, or Firm* — Akona IP PC

(57) ABSTRACT

Disclosed herein are quantum dot devices with conductive liners, as well as related computing devices and methods. For example, in some embodiments, a quantum dot device may include a first insulator material over the quantum well layer, wherein the first insulator material includes an opening (e.g., a trench); a gate metal on the first insulator material and extending into the opening; a conductive material proximate to the opening, between the quantum well layer and the first insulator material; and a second insulator material between the conductive material and the opening.

23 Claims, 25 Drawing Sheets

(56) References Cited

U.S. PATENT DOCUMENTS

| | | |
|---|---|---|
| 2010/0006821 A1 | 1/2010 | Choi et al. |
| 2012/0074386 A1 | 3/2012 | Rachmady et al. |
| 2012/0305893 A1* | 12/2012 | Colinge ................ H10D 30/62 257/29 |
| 2013/0264617 A1 | 10/2013 | Joshi et al. |
| 2014/0054717 A1* | 2/2014 | Edge ................ H10D 84/856 257/369 |
| 2016/0043234 A1* | 2/2016 | Alper ................ H10D 30/014 257/12 |
| 2019/0006506 A1 | 1/2019 | Greene et al. |
| 2019/0006572 A1 | 1/2019 | Falcon et al. |
| 2019/0035917 A1 | 1/2019 | Cheng et al. |
| 2019/0042964 A1 | 2/2019 | Elsherbini et al. |
| 2019/0042967 A1 | 2/2019 | Yoscovits et al. |
| 2019/0042968 A1 | 2/2019 | Lampert et al. |
| 2019/0043822 A1 | 2/2019 | Falcon et al. |
| 2019/0043919 A1 | 2/2019 | George et al. |
| 2019/0043950 A1 | 2/2019 | George et al. |
| 2019/0043951 A1 | 2/2019 | Thomas et al. |
| 2019/0043952 A1 | 2/2019 | Thomas et al. |
| 2019/0043953 A1 | 2/2019 | George et al. |
| 2019/0043955 A1 | 2/2019 | George et al. |
| 2019/0043968 A1 | 2/2019 | Lampert et al. |
| 2019/0043973 A1 | 2/2019 | George et al. |
| 2019/0043974 A1 | 2/2019 | Thomas et al. |
| 2019/0043975 A1 | 2/2019 | George et al. |
| 2019/0043989 A1 | 2/2019 | Thomas et al. |
| 2019/0044044 A1 | 2/2019 | Ampert et al. |
| 2019/0044045 A1 | 2/2019 | Thomas et al. |
| 2019/0044046 A1 | 2/2019 | Caudillo et al. |
| 2019/0044047 A1 | 2/2019 | Elsherbini et al. |
| 2019/0044048 A1 | 2/2019 | George et al. |
| 2019/0044049 A1 | 2/2019 | Thomas et al. |
| 2019/0044050 A1 | 2/2019 | Pillarisetty et al. |
| 2019/0044051 A1 | 2/2019 | Caudillo et al. |
| 2019/0044066 A1 | 2/2019 | Thomas et al. |
| 2019/0044668 A1 | 2/2019 | Elsherbini et al. |
| 2019/0055038 A1 | 2/2019 | Jeon et al. |
| 2019/0058002 A1 | 2/2019 | Jacob et al. |
| 2019/0066840 A1 | 2/2019 | Schoenberg |
| 2019/0066843 A1 | 2/2019 | Carlson |
| 2019/0117929 A1 | 4/2019 | Abrams et al. |
| 2019/0117930 A1 | 4/2019 | Al-Ali |
| 2019/0117972 A1 | 4/2019 | Schmidt et al. |
| 2019/0117973 A1 | 4/2019 | Schmidt et al. |
| 2019/0117974 A1 | 4/2019 | Creasey et al. |
| 2019/0117975 A1 | 4/2019 | Grossman et al. |
| 2019/0117977 A1 | 4/2019 | Puleo et al. |
| 2019/0125348 A1 | 5/2019 | Shelton, IV et al. |
| 2019/0125423 A1 | 5/2019 | Hinton et al. |
| 2019/0125456 A1 | 5/2019 | Shelton, IV et al. |
| 2019/0125498 A1 | 5/2019 | Bernhard |
| 2019/0125499 A1 | 5/2019 | Uchitel et al. |
| 2019/0125500 A1 | 5/2019 | Oskam et al. |
| 2019/0125501 A1 | 5/2019 | Esbech et al. |
| 2019/0131511 A1 | 5/2019 | Clarke et al. |
| 2019/0132963 A1 | 5/2019 | Yu et al. |
| 2019/0133027 A1 | 5/2019 | Herbster |
| 2019/0135769 A1 | 5/2019 | Thimmaiah et al. |
| 2019/0135770 A1 | 5/2019 | Plemper et al. |
| 2019/0135771 A1 | 5/2019 | Teverovskiy et al. |
| 2019/0140073 A1 | 5/2019 | Pillarisetty et al. |
| 2019/0148530 A1 | 5/2019 | Pillarisetty et al. |
| 2019/0157393 A1 | 5/2019 | Roberts et al. |
| 2019/0164077 A1 | 5/2019 | Roberts et al. |
| 2019/0164959 A1 | 5/2019 | Thomas et al. |
| 2019/0165152 A1 | 5/2019 | Roberts et al. |
| 2019/0181256 A1 | 6/2019 | Roberts et al. |
| 2019/0194016 A1 | 6/2019 | Roberts et al. |
| 2019/0198618 A1 | 6/2019 | George et al. |
| 2019/0206991 A1 | 7/2019 | Pillarisetty et al. |
| 2019/0206992 A1 | 7/2019 | George et al. |
| 2019/0206993 A1 | 7/2019 | Pillarisetty et al. |
| 2019/0214385 A1 | 7/2019 | Roberts et al. |
| 2019/0221659 A1 | 7/2019 | George et al. |
| 2019/0229188 A1 | 7/2019 | Clarke et al. |
| 2019/0229189 A1 | 7/2019 | Clarke et al. |
| 2019/0252377 A1 | 8/2019 | Clarke et al. |
| 2019/0252536 A1 | 8/2019 | George et al. |
| 2019/0259850 A1 | 8/2019 | Pillarisetty et al. |
| 2019/0266511 A1 | 8/2019 | Pillarisetty et al. |
| 2019/0267692 A1 | 8/2019 | Roberts et al. |
| 2019/0273197 A1 | 9/2019 | Roberts et al. |
| 2019/0288176 A1 | 9/2019 | Yoscovits et al. |
| 2019/0296214 A1 | 9/2019 | Yoscovits et al. |
| 2019/0305037 A1 | 10/2019 | Michalak et al. |
| 2019/0305038 A1 | 10/2019 | Michalak et al. |
| 2019/0312128 A1 | 10/2019 | Roberts et al. |
| 2019/0334020 A1 | 10/2019 | Amin et al. |
| 2019/0341459 A1 | 11/2019 | Pillarisetty et al. |
| 2019/0363181 A1 | 11/2019 | Pillarisetty et al. |
| 2019/0363239 A1 | 11/2019 | Yoscovits et al. |
| 2019/0371926 A1 | 12/2019 | Hutin et al. |
| 2019/0392352 A1 | 12/2019 | Lampert |
| 2020/0105581 A1 | 4/2020 | Chang et al. |
| 2020/0161456 A1* | 5/2020 | Leipold ................ H10D 64/27 |
| 2020/0258984 A1 | 8/2020 | George et al. |
| 2020/0295164 A1 | 9/2020 | Singh et al. |
| 2020/0312989 A1* | 10/2020 | George ................ H10D 30/014 |
| 2020/0312990 A1 | 10/2020 | Roberts et al. |
| 2021/0296473 A1 | 9/2021 | Singh et al. |
| 2021/0328019 A1 | 10/2021 | Thomas et al. |
| 2021/0343830 A1* | 11/2021 | Zhu ................ H01L 21/76897 |
| 2021/0343845 A1 | 11/2021 | George et al. |
| 2022/0013658 A1 | 1/2022 | Pillarisetty et al. |
| 2022/0140085 A1 | 5/2022 | Roberts et al. |
| 2022/0140086 A1 | 5/2022 | George et al. |
| 2022/0158069 A1 | 5/2022 | Roberts et al. |
| 2022/0182027 A1* | 6/2022 | Reilly ................ H10D 48/3835 |

FOREIGN PATENT DOCUMENTS

| | | |
|---|---|---|
| WO | 2017213639 A1 | 12/2017 |
| WO | 2017213641 A1 | 12/2017 |
| WO | 2017213645 A1 | 12/2017 |
| WO | 2017213646 A1 | 12/2017 |
| WO | 2017213647 A1 | 12/2017 |
| WO | 2017213648 A1 | 12/2017 |
| WO | 2017213649 A1 | 12/2017 |
| WO | 2017213651 A1 | 12/2017 |
| WO | 2017213661 A1 | 12/2017 |
| WO | 2017217958 A1 | 12/2017 |
| WO | 2018030977 A1 | 2/2018 |
| WO | 2018031027 A1 | 2/2018 |
| WO | 2018044267 A1 | 3/2018 |
| WO | 2018057013 A1 | 3/2018 |
| WO | 2018057015 A1 | 3/2018 |
| WO | 2018057018 A1 | 3/2018 |
| WO | 2018057023 A1 | 3/2018 |
| WO | 2018057024 A1 | 3/2018 |
| WO | 2018057027 A1 | 3/2018 |
| WO | 2018063139 A1 | 4/2018 |
| WO | 2018063168 A1 | 4/2018 |
| WO | 2018063170 A1 | 4/2018 |
| WO | 2018063202 A1 | 4/2018 |
| WO | 2018063203 A1 | 4/2018 |
| WO | 2018063205 A1 | 4/2018 |
| WO | 2018106215 A1 | 6/2018 |
| WO | 2018118098 A1 | 6/2018 |
| WO | 2018143986 A1 | 8/2018 |
| WO | 2018160184 A1 | 9/2018 |
| WO | 2018160185 A1 | 9/2018 |
| WO | 2018160187 A1 | 9/2018 |
| WO | 2018164656 A1 | 9/2018 |
| WO | 2018182571 A1 | 10/2018 |
| WO | 2018182584 A1 | 10/2018 |
| WO | 2018200006 A1 | 11/2018 |
| WO | 2018231212 A1 | 12/2018 |
| WO | 2018231241 A1 | 12/2018 |
| WO | 2018236374 A1 | 12/2018 |
| WO | 2018236403 A1 | 12/2018 |
| WO | 2018236404 A1 | 12/2018 |
| WO | 2018236405 A1 | 12/2018 |
| WO | 2019004990 A1 | 1/2019 |

(56) References Cited

FOREIGN PATENT DOCUMENTS

| | | |
|---|---|---|
| WO | 2019004991 A1 | 1/2019 |
| WO | 2019032114 A1 | 2/2019 |
| WO | 2019032115 A1 | 2/2019 |
| WO | 2019055038 A1 | 3/2019 |
| WO | 2019066840 A1 | 4/2019 |
| WO | 2019066843 A1 | 4/2019 |
| WO | 2019117883 A1 | 6/2019 |
| WO | 2019117929 A1 | 6/2019 |
| WO | 2019117930 A1 | 6/2019 |
| WO | 2019117972 A1 | 6/2019 |
| WO | 2019117973 A1 | 6/2019 |
| WO | 2019117974 A1 | 6/2019 |
| WO | 2019117975 A1 | 6/2019 |
| WO | 2019117977 A1 | 6/2019 |
| WO | 2019125348 A1 | 6/2019 |
| WO | 2019125423 A1 | 6/2019 |
| WO | 2019125456 A1 | 6/2019 |
| WO | 2019125498 A1 | 6/2019 |
| WO | 2019125499 A1 | 6/2019 |
| WO | 2019125500 A1 | 6/2019 |
| WO | 2019125501 A1 | 6/2019 |
| WO | 2019132963 A1 | 7/2019 |
| WO | 2019133027 A1 | 7/2019 |
| WO | 2019135769 A1 | 7/2019 |
| WO | 2019135770 A1 | 7/2019 |
| WO | 2019135771 A1 | 7/2019 |

OTHER PUBLICATIONS

"A Reconfigurable Gate Architecture for Si/SiGe Quantum Dots," Zajac et al., Department of Physics, Princeton University; Department of Physics, University of California; Feb. 6, 2015, 5 pages.

"A two-qubit logic gate in silicon," Veldhorst et al., Nature, vol. 526, Oct. 15, 2015, pp. 410-414.

"An addressable quantum dot qubit with fault-tolerant control-fidelity," Veldhorst et al., Nature Nanotechnology vol. 9, Dec. 2014, pp. 981-985.

"Defect reduction of selective Ge epitaxy in trenches on Si(001) substrates using aspect ratio trapping," Park et al., Applied Physics Letter 90, 052113 (2007), pp. 052113-1 through 3.

"Delaying Forever: Uniaxial Strained Silicon Transistors in a 90nm CMOS Technology," Mistry et al., Portland Technology Department, TCAD, Intel Corp., Jul. 2004; 2 pages.

"Detecting big-flip errors in a logical qubit using stabilizer measurements," Riste et al., Nature Communications, 6:6983, DOI: 10.1038/ncomms7983, pp. 1-6.

"Embracing the quantum limit in silicon computing," Morton et al., Macmillan Publishers, Nov. 17, 2011, vol. 479, Nature, pp. 345-353.

"Fabrication and Characterization of Sidewall Defined Silicon-on-Insulator Single-Electron Transistor," Jung et al., IEEE Transactions on Nanotechnology, vol. 7, No. 5, Sep. 2008, pp. 544-550.

"Fast sensing of double-dot charge arrangement and spin state with an rf sensor quantum dot," Barthel et al., Materials Department, University of California, Santa Barbara, Jan. 16, 2014, 4 pages.

"Fundamentals of Silicon Material Properties for Successful Exploitation of Strain Engineering in Modern CMOS Manufacturing," Chidambaram et al., IEE Transactions on Electron Devices, vol. 53, No. 5, May 2006, pp. 944-964.

"Gate-Defined Quantum Dots in Intrinsic Silicon," Angus et al., Nano Letters 2007, vol. 7, No. 7, 2051-2055, publication date Jun. 14, 2007, retrieved from http://pubs.acs.org on Mar. 31, 2009, 6 pages.

"How it's built: Micron/Intel3D NAND Micron Opens the Veil a Little," Moyer, Bryon, retrieved from https://www.eejournal.com/article/20160201-micron/ on Nov. 29, 2017, 9 pages.

"Independent, extensible control of same-frequency superconducting qubits by selective broadcasting," Asaad et al., Netherlands Organisation for Applied Scientific Research, Aug. 28, 2015, 17 pages.

"Investigation of Vertical Type Single-Electron Transistor with Sidewall Spacer Quantum Dot," Kim et al., Student Paper, Inter-University Semiconductor Research Center and School of Electrical Engineering and Computer Science, Seoul National University, ISDRS 2011, Dec. 7-9, 2011, ISDRS 2011—http://www.ece.umd.edu/ISDR2011, 2 pages.

"Magnetic field tuning of coplanar waveguide resonators," Healey, et al., Applied Physics Letters 93, 043513 (2008), pp. 043513-1 through 3 (4 pages with cover sheet).

"Multilayer microwave integrated quantum circuits for scalable quantum computing," Brecht et al, Department of Applied Physics, Yale University, Sep. 4, 2015, 5 pages.

"Photon- and phonon-assisted tunneling in the three-dimensional charge stability diagram of a triple quantum dot array," Braakman et al., Applied Physics Letters 102, 112110 (2013), pp. 112110-1 through 4 (5 pages with cover sheet).

"Platinum single-electron transistors with tunnel barriers made by atomic layer deposition", George et al., Department of Electrical Engineering, University of Notre Dame, Published Nov. 5, 2010, 3 pages.

"Quantum computation with quantum dots," Loss et al., Physical Review A, vol. 57, No. 1, Jan. 1998, pp. 120-126.

"Radio frequency measurements of tunnel couplings and singlet-triplet spin states in Si:P quantum dots," House et al., Nature Communications, 6:884, DOI: 10.1038/ncomms9848, published Nov. 9, 2015; pp. 1-6.

"Reducing intrinsic loss in superconducting resonators by surface treatment and deep etching of silicon substrates," Bruno, et al., QuTech Advanced Research Center and Kavli Institute of Nanoscience, Delft University of Technology, The Netherlands, Feb. 16, 2015, 9 pages.

"Review : Towards Spintronic Quantum Technologies with Dopants in Silicon," Morley, Gavin, Department of Physics, University of Warwick, Jul. 23, 2014; 13 pages.

"Scalable gate architecture for densely packed semiconductor spin qubits," Zajac et al, Department of Physics, Princeton University; Sandia National Laboratories, Jul. 24, 2016; 8 pages.

"Scalable quantum circuit and control for a superconducting surface code," Versluis et al, Netherlands Organisation for Applied Scientific Research, Dec. 28, 2016, 9 pages.

"Silicon CMOS architecture for a spin-based quantum computer," Veldhorst et al., Qutech, TU Delft, The Netherlands, Centre for Quantum Computation and Communication Technology, School of Electrical Engineering and Telecommunications, The University of New South Wales, NanoElectronics Group, MESA + Institute for Nanotechnology, University of Twente, The Netherlands, Oct. 2, 2016, 13 pages.

"Single-charge tunneling in ambipolar silicon quantum dots," Muller, Filipp, Dissertation, University of Twenty, Jun. 19, 2015, 148 pages.

"Single-electron Transistors fabricated with sidewall spacer patterning," Park et al., Superlattices and Microstructures 34 (2003) 231-239.

"Single-electron Transistors with wide operating temperature range," Dubuc et al., Applied Physics Letters 90, 113104 (2007) pp. 113104-1 through 3.

"Single-shot read-out of an individual electron spin in a quantum dot," Elzerman et al., Nature, vol. 430, Jul. 22, 2004, pp. 431-435.

"Spin Relaxation and Decoherence of Holes in Quantum Dots," Bulaev et al., Phys. Rev. Lett. 95, 076805, Aug. 11, 2005, 1 page.

"Surface loss simulations of superconducting coplanar waveguide resonators," Wenner et al, Applied Physics Letters 99, 113513 (2011), pp. 113513-1 through 3.

"Suspending superconducting qubits by silicon micromachining," Chu et al., Department of Applied Physics, Yale University, Jun. 10, 2016, 10 pages.

"Ultrafast high-fidelity initialization of a quantum-dot spin qubit without magnetic fields," Mar et al., Phys. Rev. B 90 241303®, published Dec. 15, 2014, 1 page.

"Ultrafast optical control of individual quantum dot spin qubits," De Greve et al, Reports on Progress in Physics, vol. 76, No. 9, Sep. 4, 2013, 2 pages.

"Undoped accumulation-mode Si/SiGe quantum dots," Borselli et al, HRL Laboratories, LLC., Jul. 15, 2014, 4 pages.

(56) References Cited

OTHER PUBLICATIONS

Supplementary Information, retrieved from www.nature.com, doi:10.1038/nature 15263, 8 pages (Oct. 15, 2015).

* cited by examiner

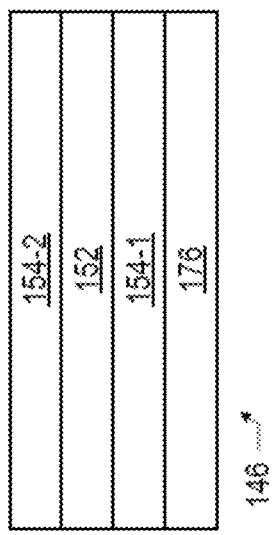
FIG. 17
FIG. 18
FIG. 19
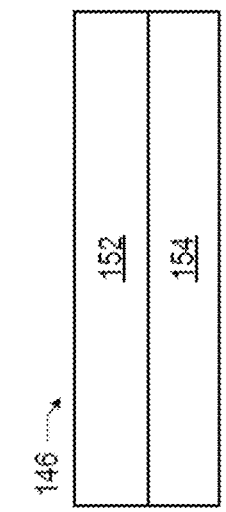
FIG. 20
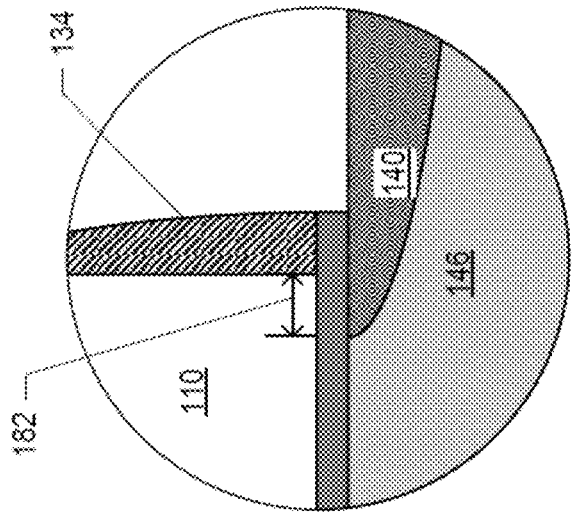
FIG. 21

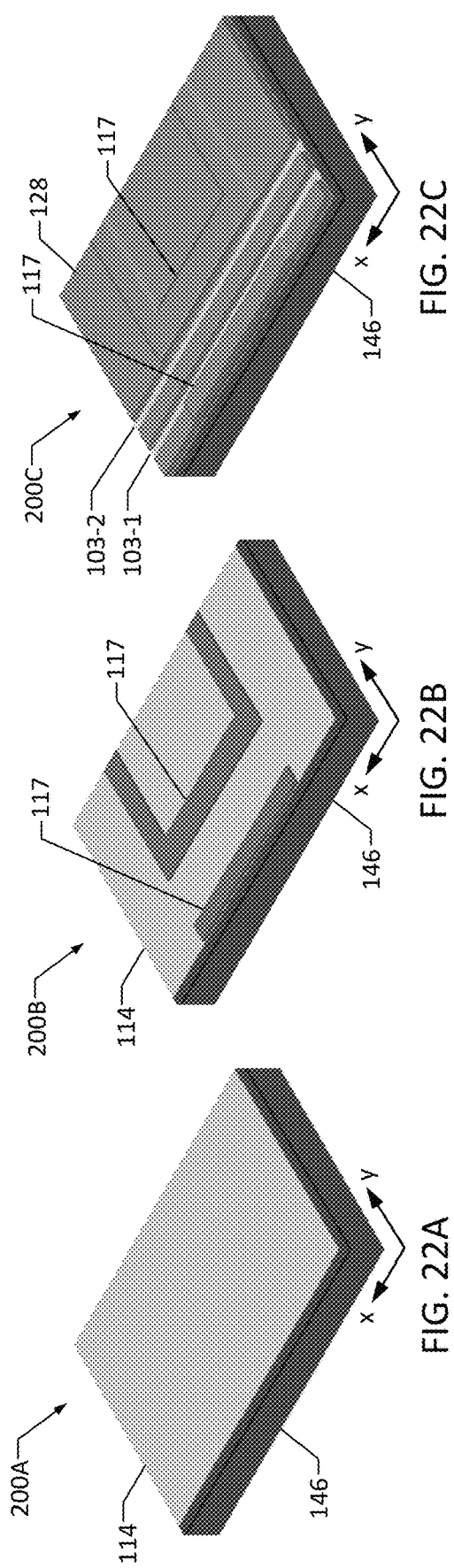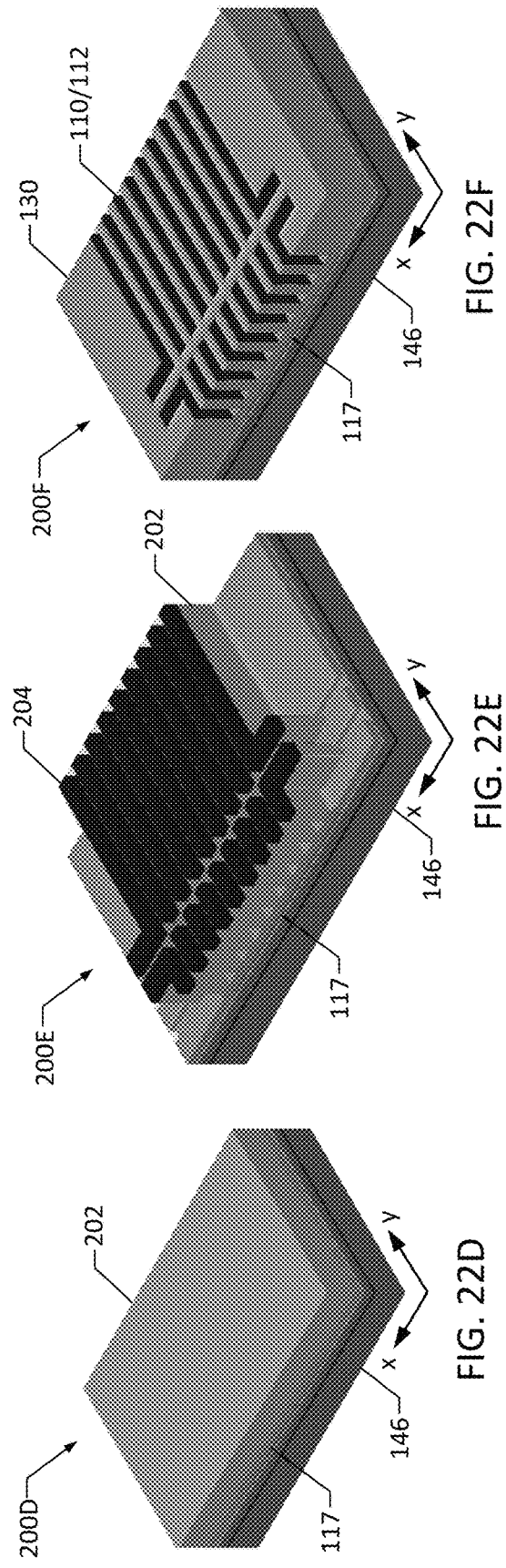

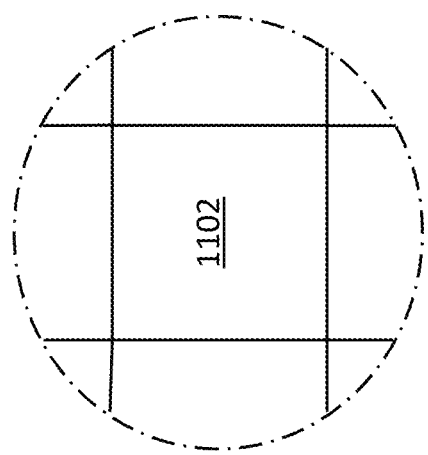
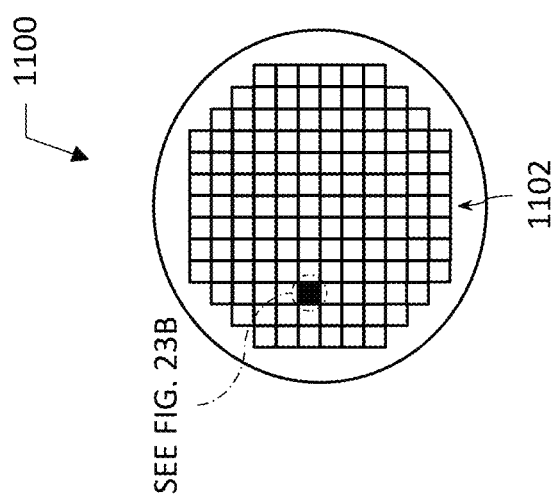
FIG. 23B
FIG. 23A

TRENCH-BASED QUANTUM DOT DEVICES WITH CONDUCTIVE LINERS

BACKGROUND

Quantum computing refers to the field of research related to computation systems that use quantum mechanical phenomena to manipulate data. These quantum mechanical phenomena, such as superposition (in which a quantum variable can simultaneously exist in multiple different states) and entanglement (in which multiple quantum variables have related states irrespective of the distance between them in space or time), do not have analogs in the world of classical computing, and thus cannot be implemented with classical computing devices.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIGS. 17-19 are cross-sectional views of various examples of quantum well stacks that may be used in trench-based quantum dot devices, in accordance with various embodiments.

FIGS. 20-21 illustrate detail views of various embodiments of doped regions in trench-based quantum dot devices, in accordance with various embodiments.

FIGS. 22A-22F illustrate various example stages in the manufacture of a quantum dot device, in accordance with various embodiments.

FIGS. 23A and 23B are top-down views of a wafer and dies that may include one or more of quantum dot devices disclosed herein.

DETAILED DESCRIPTION

Figure 1:
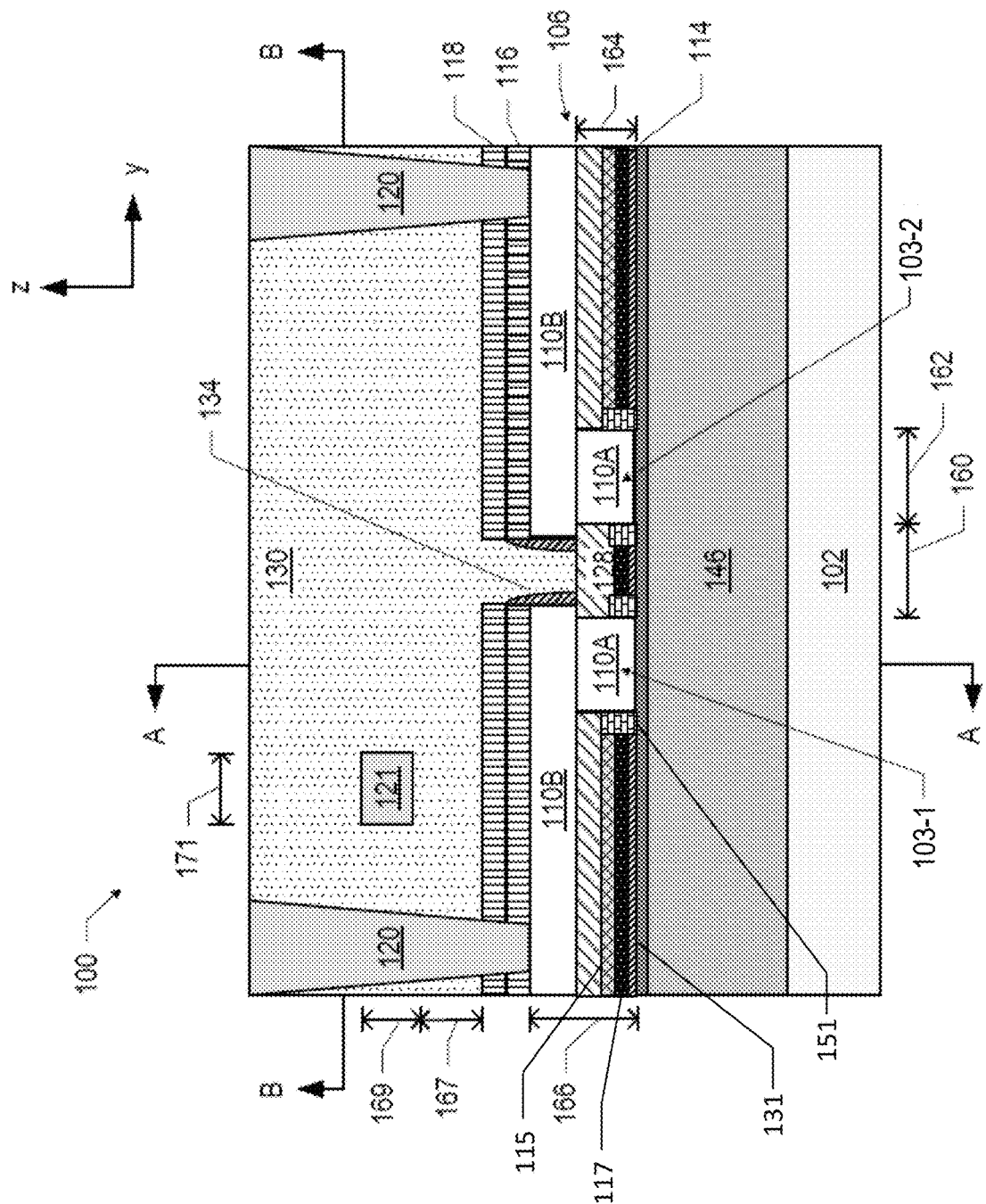
FIGS. 1-4 are cross-sectional and top-down views of a quantum dot device, in accordance with various embodiments.

Disclosed herein are quantum dot devices with conductive liners, as well as related computing devices and methods. For example, in some embodiments, a quantum dot device may include a first insulator material over the quantum well layer, wherein the first insulator material includes an opening (e.g., a trench); a gate metal on the first insulator material and extending into the opening; a conductive material proximate to the opening, between the quantum well layer and the first insulator material; and a second insulator material between the conductive material and the opening.

The quantum dot devices disclosed herein may enable the formation of quantum dots to serve as quantum bits ("qubits") in a quantum computing device, as well as the control of these quantum dots to perform quantum logic operations. Unlike previous approaches to quantum dot formation and manipulation, various embodiments of the quantum dot devices disclosed herein provide strong spatial localization of the quantum dots (and therefore good control over quantum dot interactions and manipulation), good scalability in the number of quantum dots included in the device, and/or design flexibility in making electrical connections to the quantum dot devices to integrate the quantum dot devices in larger computing devices.

In the following detailed description, reference is made to the accompanying drawings that form a part hereof, and in which is shown, by way of illustration, embodiments that may be practiced. It is to be understood that other embodiments may be utilized, and structural or logical changes may be made, without departing from the scope of the present disclosure. Therefore, the following detailed description is not to be taken in a limiting sense.

In the drawings, some schematic illustrations of example structures of various devices and assemblies described herein may be shown with precise right angles and straight lines, but it is to be understood that such schematic illustrations may not reflect real-life process limitations which may cause the features to not look so "ideal" when any of the structures described herein are examined using e.g., scanning electron microscopy (SEM) images or transmission electron microscope (TEM) images. In such images of real structures, possible processing defects could also be visible, such as e.g., not-perfectly straight edges of materials, tapered vias or other openings, inadvertent rounding of corners or variations in thicknesses of different material layers, occasional screw, edge, or combination dislocations within the crystalline region, and/or occasional dislocation defects of single atoms or clusters of atoms. There may be other defects not listed here but that are common within the field of device fabrication. The accompanying drawings are not necessarily drawn to scale. For convenience, the collection of drawings of FIGS. 16A-16D may be referred to herein as "FIG. 16," and the collection of drawings of FIGS. 23A and 23B may be referred to herein as "FIG. 23."

Various operations may be described as multiple discrete actions or operations in turn in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The term "between," when used with reference to measurement ranges, is inclusive of the ends of the measurement ranges. As used herein, the notation "A/B/C" means (A), (B), and/or (C). The terms "substantially," "close," "approximately," "near," and "about," generally refer to being within +/−10% of a target value based on the context of a particular value as described herein or as known in the art, e.g., within +/−5% of a target value or within +/−2% of a target value. Similarly, terms indicating orientation of various elements, e.g., "coplanar," "perpendicular,"

"orthogonal," "parallel," or any other angle between the elements, generally refer to being within +/−10% of a target value based on the context of a particular value as described herein or as known in the art, e.g., within +/−5% of a target value or within +/−2% of a target value.

The description uses the phrases "in an embodiment" or "in embodiments," which may each refer to one or more of the same or different embodiments. Furthermore, the terms "comprising," "including," "having," and the like, as used with respect to embodiments of the present disclosure, are synonymous. The disclosure may use perspective-based descriptions such as "above," "below," "top," "bottom," and "side"; such descriptions are used to facilitate the discussion and are not intended to restrict the application of disclosed embodiments. As used herein, a "high-k dielectric" refers to a material having a higher dielectric constant than silicon oxide, and a "low-k dielectric" refers to a material having a lower dielectric constant than silicon oxide. As used herein, a "magnet line" refers to a magnetic field-generating structure to influence (e.g., change, reset, scramble, or set) the spin states of quantum dots. One example of a magnet line, as discussed herein, is a conductive pathway that is proximate to an area of quantum dot formation and selectively conductive of a current pulse that generates a magnetic field to influence a spin state of a quantum dot in the area. Furthermore, as used herein, terms indicating what may be considered an idealized behavior, such as e.g., "lossless" (or "low-loss") or "superconductive/superconducting," are intended to cover functionality that may not be exactly ideal but is within acceptable margins for a given application. For example, a certain level of loss, either in terms of nonzero electrical resistance or nonzero amount of spurious two-level systems (TLSs) may be acceptable such that the resulting materials and structures may still be referred to by these "idealized" terms. Specific values associated with an acceptable level of loss are expected to change over time as fabrication precision will improve and as fault-tolerant schemes may become more tolerant of higher losses, all of which are within the scope of the present disclosure.

In various embodiments, trench-based quantum dot device with conductive liners as described herein may be implemented as components associated with a quantum integrated circuit (IC). Such components may include those that are mounted on or embedded in a quantum IC, or those connected to a quantum IC. The quantum IC may be either analog or digital and may be used in a number of applications within or associated with quantum systems, such as e.g., quantum processors, quantum amplifiers, quantum sensors, etc., depending on the components associated with the IC. The IC may be employed as part of a chipset for executing one or more related functions in a quantum system.

In order to provide substantially lossless connectivity to, from, and between the qubits, some or all of the electrically conductive portions of trench-based quantum dot device with conductive liners as described herein, in particular various gates and conductive liners described herein, as well as other components of quantum dot devices, may be made from one or more superconductive materials. However, some or all of these electrically conductive portions could be made from electrically conductive materials which are not superconductive. In the following, unless specified otherwise, reference to an electrically conductive material implies that a superconductive material can be used, and vice versa. Furthermore, materials described herein as "superconductive/superconducting materials" may refer to materials, including alloys of materials, that exhibit superconducting behavior at typical qubit operating conditions (e.g., materials which exhibit superconducting behavior at very low temperatures at which qubits typically operate), but which may or may not exhibit such behavior at higher temperatures (e.g., at room temperatures). Examples of such materials include aluminum (Al), niobium (Nb), niobium nitride (NbN), titanium nitride (TiN), niobium titanium nitride (NbTiN), indium (In), and molybdenum rhenium (MoRe), all of which are particular types of superconductors at qubit operating temperatures, as well as their alloys.

Quantum dot devices enable formation of quantum dots to serve as quantum bits (i.e., as qubits) in a quantum computing device, as well as formation of quantum dots to serve as a part of one or more devices such as single-electron-transistors (SETs) for reading/detecting states of said qubits. In particular, quantum dot devices described herein include rows of quantum dot formation regions—at least one row being a row of a quantum dot formation region where quantum dots for serving as qubits are formed, and at least one other row being a row of a quantum dot formation region where quantum dots for serving as a part of one or more SETs are formed.

In various implementations of quantum dot devices utilizing quantum well stacks, rows of quantum dot formation regions may be formed according to different approaches. According to one approach, a row of a quantum dot formation region may be defined by an insulating material provided over a continuous quantum well stack, the insulating material including a trench corresponding to the row (i.e., multiple trenches if there are multiple rows of quantum dot formation regions), the trench extending toward the continuous quantum well stack, and portions of gate metals of different gates being at least partially in the trench. In such implementations, even though the quantum well stack is continuous along a portion of a plane, i.e., continuous in a two-dimensional plane, confinement of the quantum dot formation region to a row (i.e., confinement of the quantum dots formed in a region that is a row), i.e., confinement to substantially one direction, is achieved by the confinement to substantially one direction of the trench in the insulating material, the trench at least partially filled with one or more gate metals. According to another approach, a row of a quantum dot formation region may be defined by at least a portion of a quantum well stack being formed as a fin corresponding to the row (i.e., multiple fins if there are multiple rows of quantum dot formation regions), and portions of gate metals of different gates being over the fin. In such implementations, confinement of the quantum dot formation region to a row is achieved by the confining the quantum well stack to the fin. Thus, in contrast to the first approach, in the second approach at least portions of the quantum well stack may not be horizontally continuous across different fins. Quantum dot devices formed according to the first approach may be referred to as "trench-based" quantum dot devices, while quantum dot devices formed according to the second approach may be referred to as "fin-based" quantum dot devices. In various embodiments, the quantum dot devices disclosed herein may provide two-dimensional arrays of quantum dots (e.g., quantum dots 142) during operation, with the quantum dots constrained in "rows" by the quantum dot formation regions (e.g., quantum dot formation regions 111) and "columns" by the gates (e.g., gates 106/108), as discussed below. In some embodiments, individual ones of the gates (e.g., of the gates 106/108) may be shared between multiple quantum dot formation regions. Quantum dot devices with conductive liners as described herein may be implemented with said row of quantum dot formation regions defined according to the first approach (i.e., various embodiments of the present disclosure relate to trench-based quantum dot devices).

Trench-based quantum dot devices are quantum dot devices having a base, a continuous quantum well layer extending over the base, an insulating material over the quantum well layer, one or more trenches in the insulating material, and one or more gates with gate metals at least partially disposed in the trenches. In such devices, the quantum well layer is not etched into fins, as in fin-based devices. A quantum dot formed in such a device may be constrained in the x-direction by the one or more gates, in the y-direction by the trench, and in the z-direction by the quantum well layer, as discussed in detail herein. Unlike previous approaches to quantum dot formation and manipulation, trench-based quantum dot devices provide strong spatial localization of the quantum dots (and therefore good control over quantum dot interactions and manipulation), good scalability in the number of quantum dots included in the device, and/or design flexibility in making electrical connections to the quantum dot devices to integrate the quantum dot devices in larger computing devices.

Figure 2:
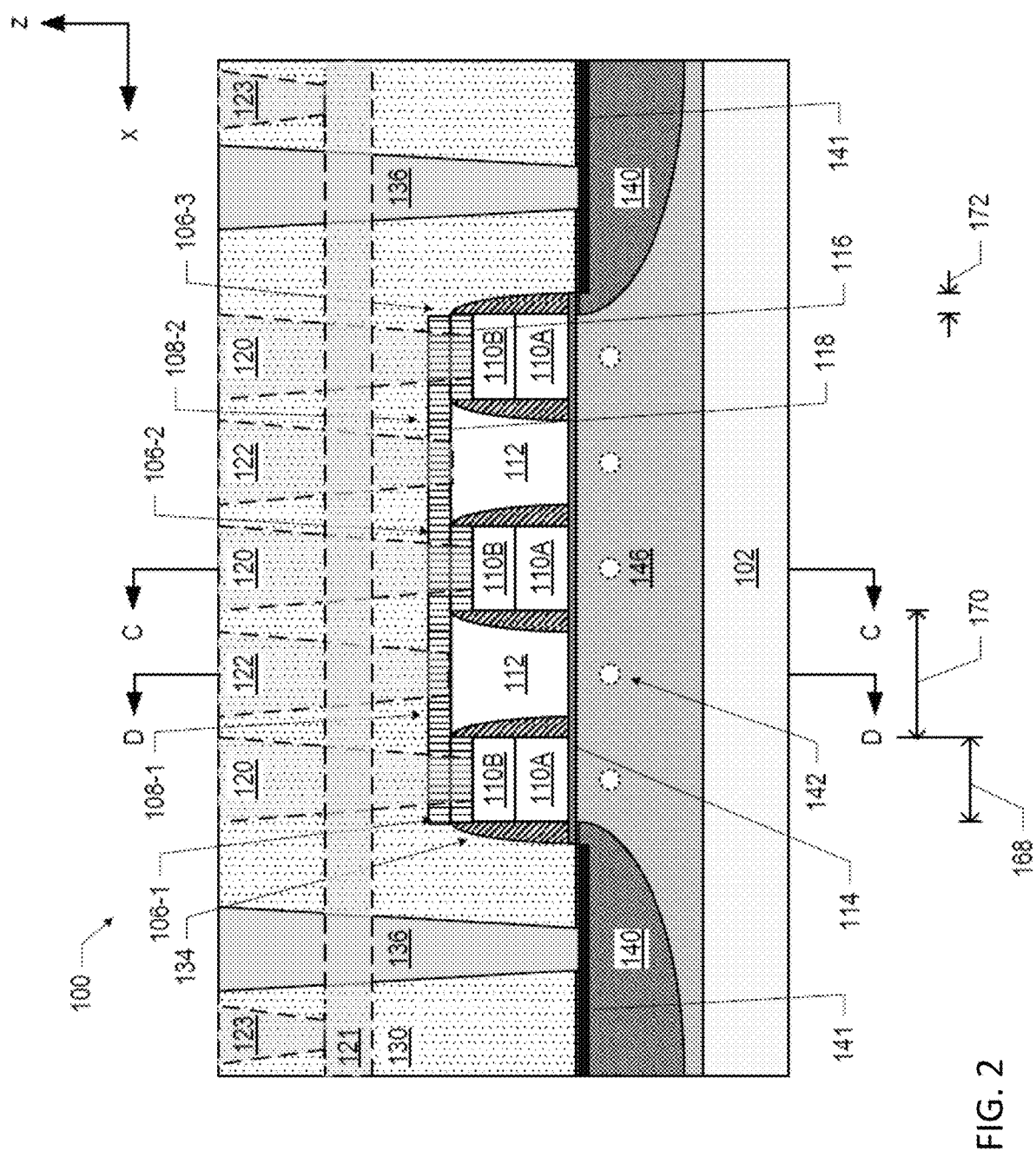
Figure 3:
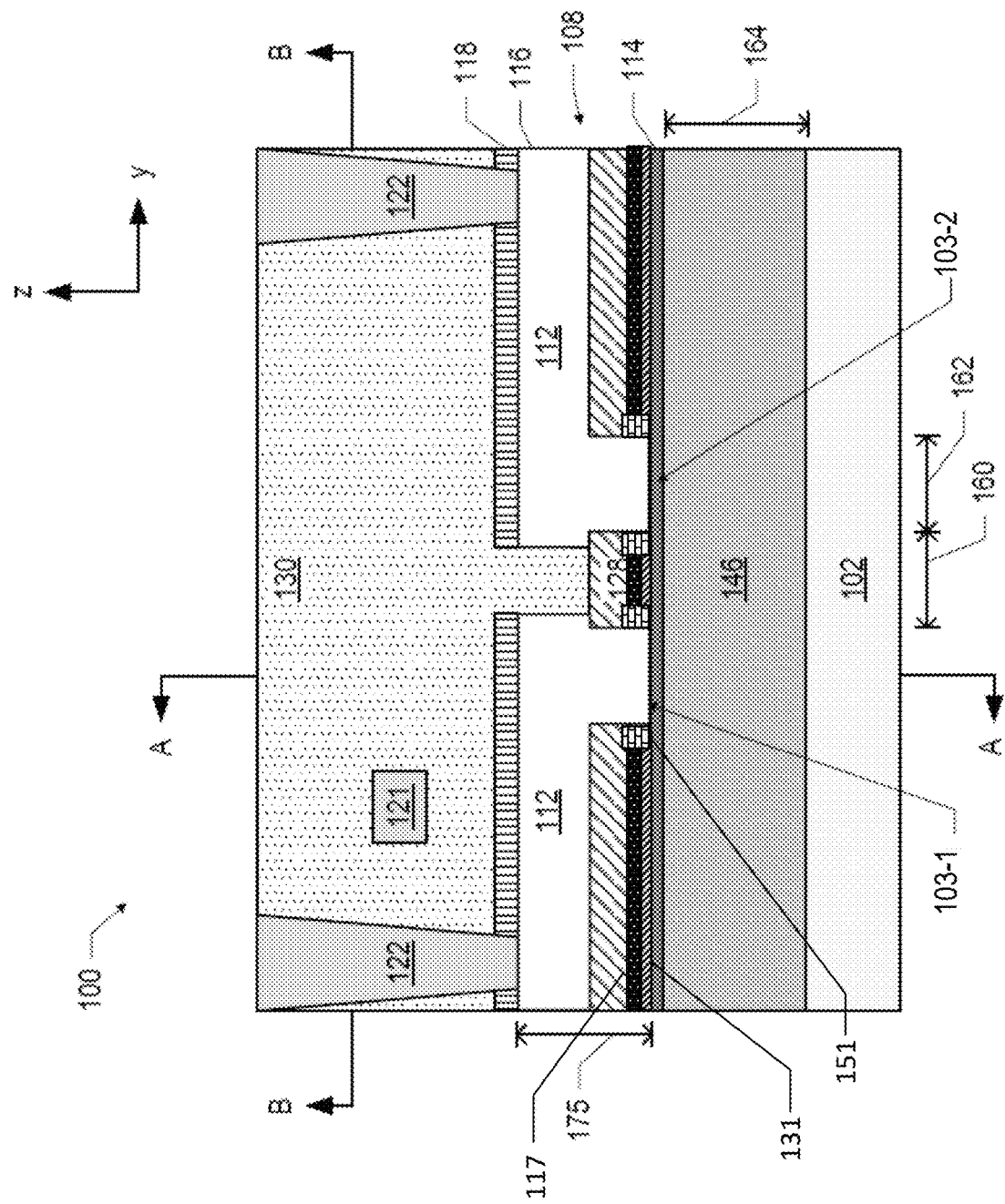
Figure 4:
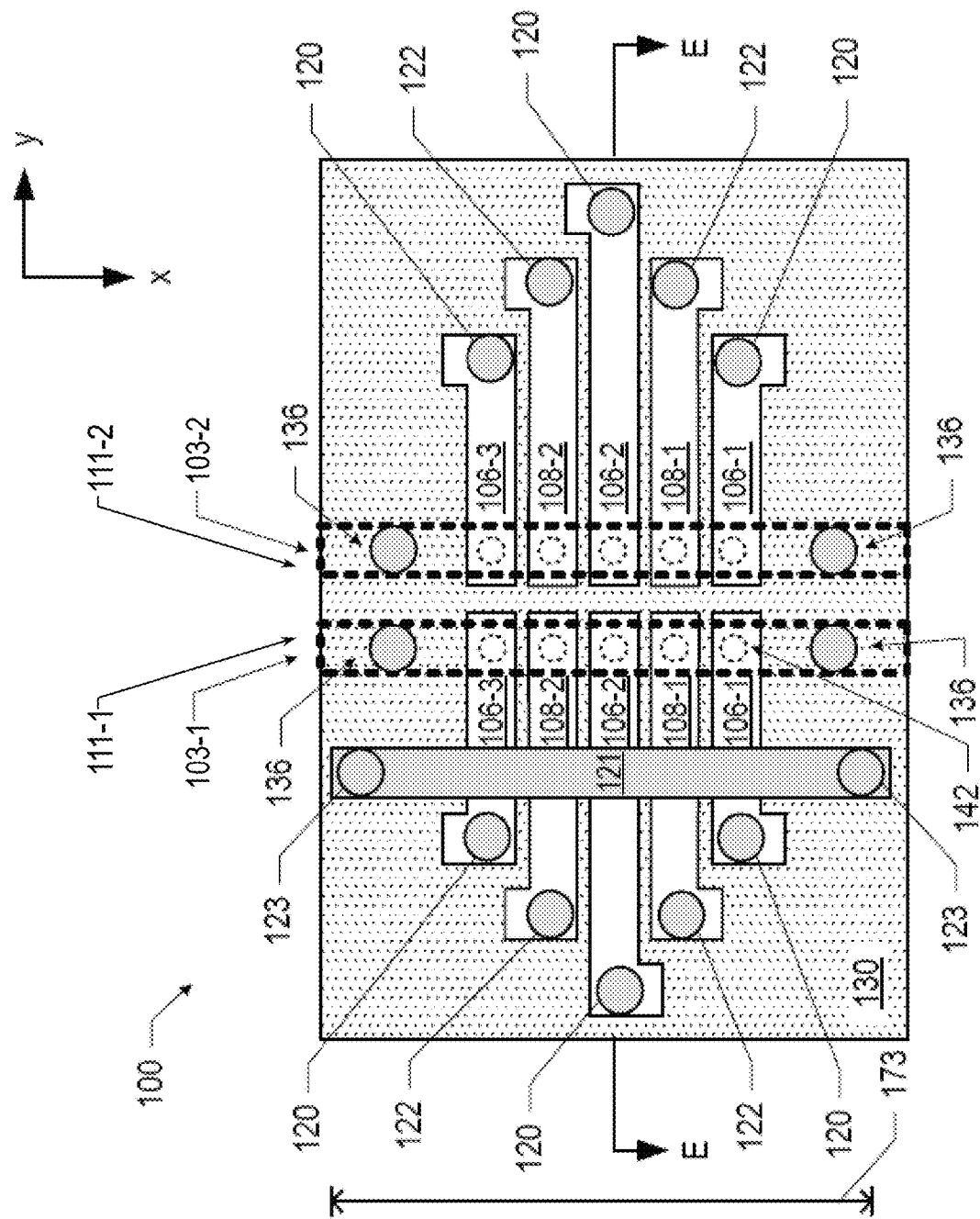

FIGS. 1-4 are cross-sectional and top-down views of a quantum dot device 100, in accordance with various embodiments. In particular, FIGS. 1-3 provide cross-sectional views of the quantum dot device 100, where FIG. 2 illustrates the quantum dot device 100 taken along the section A-A of FIG. 1 (while FIG. 1 illustrates the quantum dot device 100 taken along the section C-C of FIG. 2) and FIG. 3 illustrates the quantum dot device 100 taken along the section D-D of FIG. 2 (while FIG. 2 illustrates the quantum dot device 100 taken along the section A-A of FIG. 3), while FIG. 4 illustrates a top-down view of the quantum dot device 100 (i.e., a view taken along the section B-B of FIG. 1 with a number of components not shown to more readily illustrate how the gates 106/108 and the magnet line 121 may be patterned). FIG. 1 illustrates the quantum dot device 100 taken along the section E-E of FIG. 4. Although FIG. 1 indicates that the cross-section illustrated in FIG. 2 is taken through the trench 103-1, an analogous cross-section taken through the trench 103-2 may be identical, and thus the discussion of FIG. 2 refers generally to the "trench 103."

The quantum dot device 100 may include a quantum well stack 146 disposed on a base 102. An insulating material 128 may be disposed above the quantum well stack 146, and multiple trenches 103 in the insulating material 128 may extend toward the quantum well stack 146 (hence, the quantum dot device 100 is a trench-based quantum dot device). In the embodiment illustrated in FIGS. 1-4, a gate dielectric 114 may be disposed between the quantum well stack 146 and the insulating material 128 so as to provide the "bottom" of the trenches 103. A number of examples of quantum well stacks 146 are discussed below with reference to FIGS. 17-19.

Although only two trenches, 103-1 and 103-2, are shown in FIGS. 1-4, this is simply for ease of illustration, and more than two trenches 103 may be included in the quantum dot device 100. In some embodiments, the total number of trenches 103 included in the quantum dot device 100 is an even number, with the trenches 103 organized into pairs including one active trench 103 and one read trench 103, as discussed in detail below. When the quantum dot device 100 includes more than two trenches 103, the trenches 103 may be arranged in pairs in a line (e.g., 2N trenches total may be arranged in a 1×2N line, or a 2×N line) or in pairs in a larger array (e.g., 2N trenches total may be arranged as a 4×N/2 array, a 6×N/3 array, etc.). As illustrated in FIGS. 1, 3, and 4, in some embodiments, multiple trenches 103 may be oriented substantially in parallel. The discussion herein will largely focus on a single pair of trenches 103 for ease of illustration, but all the teachings of the present disclosure apply to quantum dot devices 100 with more trenches 103. Further, the use of the term "trench" should not be interpreted to require that the insulating material 128 is deposited first and then a portion of that insulating material 128 is excavated to form the trench 103 prior to depositing material in the trench 103; in various embodiments, the insulating material 128 may be deposited before or after deposition of the material that will ultimately be disposed in the trench 103.

The quantum dot device 100 of FIGS. 1-4 may include multiple quantum dot formation regions 111 (labeled in FIG. 4), defined by the parallel trenches 103 in the insulating material 128 disposed on top of the quantum well stack 146. These quantum dot formation regions 111 may be portions of the quantum well stack 146 in which quantum dots 142 may form during operation. The quantum dot formation regions 111 may be arranged as multiple parallel rows defined by the trenches 103, and the gates 106/108 may each extend over multiple ones of the quantum dot formation regions 111.

The quantum well stack 146 may include a quantum well layer (not shown in FIGS. 1-4 but discussed below with reference to the quantum well layer 152 of FIGS. 17-19). The quantum well layer included in the quantum well stack 146 may be arranged normal to the z-direction, and may provide a layer in which a two-dimensional electron gas (2DEG) may form to enable the generation of one or more quantum dots during operation of the quantum dot device 100, as discussed in further detail below. The quantum well layer itself may provide a geometric constraint on the z-location of quantum dots in the quantum well stack 146. To control the x- and y-location of quantum dots in the quantum well stack 146, voltages may be applied to gates disposed at least partially in the trenches 103 above the quantum well stack 146 to adjust the energy profile along the trenches 103 in the x- and y-direction and thereby constrain the x- and y-location of quantum dots within quantum wells (discussed in detail below with reference to the gates 106/108). The dimensions of the trenches 103 may take any suitable values. For example, in some embodiments, the trenches 103 may each have a width 162 between about 5 nanometers and 50 nanometers. In some embodiments, the trenches 103 may each have a depth 164 between about 40 nanometers and 400 nanometers (e.g., between about 50 nanometers and 350 nanometers, or equal to about 100 nanometers). The insulating material 128 may be a dielectric material (e.g., an interlayer dielectric), such as silicon oxide. In some embodiments, the insulating material 128 may be a chemical vapor deposition (CVD) or flowable CVD oxide. In some embodiments, the trenches 103 may be spaced apart by a distance 160 between about 30 nanometers and 300 nanometers.

A conductive material 117 may be disposed proximate to the quantum well stack 146, in between the insulating material 128 and the quantum well stack 146. In the embodiments where the gate dielectric 114 is present in the quantum dot device 100, the conductive material 117 may be between the insulating material 128 and the gate dielectric 114, and the gate dielectric 114 may be between the insulating material 128 and the quantum well stack 146. In some such embodiments, the conductive material 117 may be spaced away from the gate dielectric 114 by an intervening material 131, e.g., as shown in FIG. 1 and FIG. 3. In some embodiments, the intervening material 131 may be in contact with the gate dielectric 114 on one side and/or in contact with the conductive material 117 on the other side. In some embodiments, the conductive material 117 may be in contact with the intervening material 131 on one side and/or in contact with the insulating material 128 on the other side. In all these embodiments, the conductive material 117 is at the bottom of the insulating material 128, proximate to the top surface of the quantum well stack 146.

In some embodiments, a hardmask 115 may further be disposed over the conductive material 117, e.g., as shown in FIG. 1. In such embodiments, the conductive material 117 may be between the quantum well stack 146 and the hardmask 115, and the hardmask 115 may be between the conductive material 117 and the insulating material 128. The hardmask 115 may include any of the materials as described with reference to the hardmask 116 or hardmask 118. For example, the hardmask 115 may be formed of silicon nitride, silicon carbide, or another suitable material. In other embodiments of the quantum dot device 100 as shown in FIG. 1, the hardmask material 115 may be absent. Although other drawings of quantum dot devices, such as the ones shown in FIGS. 2-16, do not illustrate the hardmask 115, in further embodiments of these quantum dot devices the hardmask material 115 may be included so that the conductive material 117 is between the quantum well stack 146 and the hardmask 115, and the hardmask 115 is between the conductive material 117 and the insulating material 128.

A thickness of the conductive material 117 (i.e., a dimension of the conductive material 117 measured along the z-axis of the example coordinate system shown in the present drawings) may be between about 1 nanometer and 20 nanometers (e.g., between about 2 nanometers and 10 nanometers). In some embodiments, the conductive material 117 may be a metal (e.g., any of the materials discussed herein with reference to the gate metals 110/112, such as titanium nitride). In some embodiments, the conductive material 117 may be a superconducting material.

A thickness of the intervening material 131 (i.e., a dimension of the intervening material 131 measured along the z-axis of the example coordinate system shown in the present drawings) may be between about 1 nanometer and 30 nanometers (e.g., between about 2 nanometers and 15 nanometers). In some embodiments, the intervening material 131 may be a material that is etch-selective with respect to the conductive material 117. In such embodiments, when the conductive material 117 is patterned according to a subtractive fabrication flow using one or more etchants, the etchants used to remove the conductive material 117 do not substantially remove the intervening material 131. Similarly, when the trenches 103 are formed in a way as to expose the underlying gate dielectric 114, or the quantum well stack 146 if no gate dielectric 114 is included, etchants used to remove the intervening material 131 do not substantially remove the conductive material 117. In some embodiments, the intervening material 131 may be a low loss dielectric material. In some embodiments, the intervening material 131 may be a low loss dielectric material, as discussed below with reference to low loss dielectric materials 151 discussed below. In some embodiments, the intervening material 131 and the dielectric materials 151 (when present) may have different material compositions. In some embodiments, the intervening material 131 and the insulating material 128 (discussed below) may have different compositions.

In some embodiments, a dielectric material 151 (or, more generally, an insulating material) may be present between the conductive material 117 and the gate metals 110/112 of the gates provided in the trenches 103. For example, as illustrated in FIGS. 1 and 3, a low loss dielectric material 151 may be disposed on either side face of the trenches 103. In some such embodiments, the conductive material 117 may be spaced away from the gate metals 110/112 by the dielectric material 151, e.g., as shown in FIG. 1 and FIG. 3. In some embodiments, the dielectric material 151 may be in contact with the gate metals 110/112 on one side and/or in contact with the conductive material 117 on the other side. In some embodiments, the dielectric material 151 may include one or more low loss dielectric materials 151. As used herein, a "low loss dielectric material" is one whose loss tangent is less than the loss tangent of the insulating material 128. Utilizing low loss dielectric materials 151 near the quantum well layer 152 or other sensitive layers of the quantum well stack 146 of the quantum dot device 100 may reduce the charge noise present in these layers during operation, and thus may improve device operation. A width of the low loss dielectric material 151 (i.e., a dimension measured along the y-axis of the example coordinate system shown in FIG. 1) may have any suitable value, such as between about 1 nanometer and 100 nanometers, e.g., between about 3 nanometers and 75 nanometers or between about 5 nanometers and 50 nanometers (e.g., between about 15 and 30 nanometers).

The conductive material 117 may be provided as a conductive liner of the quantum dot device 100, e.g., a plurality of conductive liners electrically isolated from one another. Signals may be applied to the conductive material 117 to control electrostatics of the quantum dot device 100.

An electrically insulating material 128 may further be disposed between the trenches 103. In some embodiments, the insulating material 128 may be a nitride (e.g., silicon nitride or another nitride). In some embodiments, the insulating material 128 may include germanium, carbon, or phosphorous. In some embodiments, the insulating material 128 may include silicon oxide, silicon nitride, silicon carbide, silicon oxynitride, or silicon oxycarbide. In some embodiments, the insulating material 128 may include a carbosilane dielectric. A carbosilane dielectric may be a dielectric film that includes crosslinked cyclic carbosilanes. A cyclic carbosilane may have a ring structure including carbon and silicon. In some embodiments, a carbosilane dielectric may have a carbon content between 45 atomic-percent and 60 atomic-percent, a silicon content between 25 atomic-percent and 35 atomic-percent, and an oxygen content between 10 atomic-percent and 20 atomic-percent. Some carbosilane dielectrics that may be included in the insulating material 128 may have a k-value between 1.6 and 2.5. Some carbosilane dielectrics may have a porosity between 5 percent and 60 percent (e.g., between 35 percent and 50 percent).

Multiple gates may be disposed at least partially in each of the trenches 103. In the embodiment illustrated in FIG. 2, three gates 106 and two gates 108 are shown as distributed at least partially in a single trench 103. This particular number of gates is simply illustrative, and any suitable number of gates may be used (in fact, FIG. 22F showing an embodiment of manufacturing a quantum dot device with conductive liners of the conductive material 117 illustrates more than a total of five gates). Additionally, in some embodiments, multiple groups of gates (like the gates illustrated in FIG. 2) may be disposed at least partially in the trench 103.

As shown in FIG. 2, the gate 108-1 may be disposed between the gates 106-1 and 106-2, and the gate 108-2 may be disposed between the gates 106-2 and 106-3. Each of the gates 106/108 may include a gate dielectric 114; in the embodiment illustrated in FIG. 2, the gate dielectric 114 for all of the gates 106/108 is provided by a common layer of gate dielectric material disposed between the quantum well stack 146 and the insulating material 128. In other embodiments, the gate dielectric 114 for each of the gates 106/108 may be provided by separate portions of gate dielectric 114 (i.e., the gate dielectric 114 may not be continuous across multiple ones of the gates 106/108). In some embodiments, the gate dielectric 114 may be a multilayer gate dielectric (e.g., with multiple materials used to improve the interface between the trench 103 and the corresponding gate metal). The gate dielectric 114 may be, for example, silicon oxide, aluminum oxide, or a high-k dielectric, such as hafnium oxide. More generally, the gate dielectric 114 may include elements such as hafnium, silicon, oxygen, titanium, tantalum, lanthanum, aluminum, zirconium, barium, strontium, yttrium, lead, scandium, niobium, and zinc. Examples of materials that may be used in the gate dielectric 114 may include, but are not limited to, hafnium oxide, hafnium silicon oxide, lanthanum oxide, lanthanum aluminum oxide, zirconium oxide, zirconium silicon oxide, tantalum oxide, titanium oxide, barium strontium titanium oxide, barium titanium oxide, strontium titanium oxide, yttrium oxide, aluminum oxide, tantalum oxide, tantalum silicon oxide, lead scandium tantalum oxide, and lead zinc niobate. In some embodiments, an annealing process may be carried out on the gate dielectric 114 to improve the quality of the gate dielectric 114.

Each of the gates 106 may include a gate metal 110 (including multiple layers of gate metal) and a hardmask 116. In particular, a first gate metal layer 110A may be disposed in the trench 103, and a second gate metal layer 110B may be disposed above the gate metal 110-1 and above the insulating material 128, as shown. The hardmask 116 may be formed of silicon nitride, silicon carbide, or another suitable material. The gate metal 110 may be disposed between the hardmask 116 and the gate dielectric 114, and the gate dielectric 114 may be disposed between the gate metal 110 and the quantum well stack 146. As shown in FIG. 1, in some embodiments, the gate metal 110 of a gate 106 may extend over the insulating material 128 and into a trench 103 in the insulating material 128. Only one portion of the hardmask 116 is labeled in FIG. 2 for ease of illustration.

In some embodiments, the gate metal 110 may be a superconductor, such as aluminum, titanium nitride, or niobium titanium nitride; any of these materials may be included in the first gate metal layer 110A and/or the second gate metal layer 110B. In some embodiments, the first gate metal layer 110A may have a different material composition than the second gate metal layer 110B. For example, the first gate metal layer 110A may be titanium nitride, while the second gate metal layer 110B may be a material different from titanium nitride, or vice versa. In some embodiments, the first gate metal layer 110A and the second gate metal layer 110B may have the same material composition but a different microstructure. These different microstructures may arise, for example, by different deposition and/or patterning techniques used to form the first gate metal layer 110A and the second gate metal layer 110B. For example, in some embodiments, the first gate metal layer 110A may have a microstructure including columnar grains (e.g., when the first gate metal layer 110A is initially blanket-deposited and then etched as part of a subtractive patterning process), while the second gate metal layer 110B may not exhibit a columnar grain structure. In some embodiments, a seam delineating the interface between the top surface of the first gate metal layer 110A and the bottom surface of the second gate metal layer 110B may be present in the quantum dot device 100.

In some embodiments, the hardmask 116 may not be present in the quantum dot device 100 (e.g., a hardmask like the hardmask 116 may be removed during processing). The sides of the gate metal 110 may be substantially parallel, as shown in FIG. 2, and insulating spacers 134 may be disposed on the sides of the gate metal 110 and the hardmask 116 along the longitudinal axis of the trench 103. As illustrated in FIG. 2, the spacers 134 may be thicker closer to the quantum well stack 146 and thinner farther away from the quantum well stack 146. In some embodiments, the spacers 134 may have a convex shape. The spacers 134 may be formed of any suitable material, such as a carbon-doped oxide, silicon nitride, silicon oxide, or other carbides or nitrides (e.g., silicon carbide, silicon nitride doped with carbon, and silicon oxynitride). As illustrated in FIG. 1, no spacer material may be disposed between the gate metal 110 and the sidewalls of the trench 103 in the y-direction.

Each of the gates 108 may include a gate metal 112 and a hardmask 118. The hardmask 118 may be formed of silicon nitride, silicon carbide, or another suitable material. The gate metal 112 may be disposed between the hardmask 118 and the gate dielectric 114, and the gate dielectric 114 may be disposed between the gate metal 112 and the quantum well stack 146. As shown in FIG. 3, in some embodiments, the gate metal 112 of a gate 108 may extend over the insulating material 128 and into a trench 103 in the insulating material 128. In the embodiment illustrated in FIG. 2, the hardmask 118 may extend over the hardmask 116 (and over the gate metal 110 of the gates 106), while in other embodiments, the hardmask 118 may not extend over the gate metal 110. In the embodiment of FIGS. 1-3, the gate metal 112 of the gates 108 may be provided by a single continuous layer of material (and may not, for example, include multiple different layers of gate metal, as was discussed above with reference to the gate metal 110 of the gates 106). In other embodiments, however, the gate metal 112 of the gates 108 may include multiple layers of gate metal, e.g., multiple layers similar to the first gate metal layer 110A and the second gate metal layer 110B. In some embodiments, the gate metal 112 may be a different metal from the first gate metal layer 110A and/or the second gate metal layer 110B; in other embodiments, the gate metal 112 and the first gate metal layer 110A and/or the second gate metal layer 110B may have the same material composition. In some embodiments, the gate metal 112 may be a superconductor, such as aluminum, titanium nitride, or niobium titanium nitride. In some embodiments, the hardmask 118 may not be present in the quantum dot device 100 (e.g., a hardmask like the hardmask 118 may be removed during processing).

The gate 108-1 may extend between the proximate spacers 134 on the sides of the gate 106-1 and the gate 106-2 along the longitudinal axis of the trench 103, as shown in FIG. 2. In some embodiments, the gate metal 112 of the gate 108-1 may extend between the spacers 134 on the sides of the gate 106-1 and the gate 106-2 along the longitudinal axis of the trench 103. Thus, the gate metal 112 of the gate 108-1 may have a shape that is substantially complementary to the shape of the spacers 134, as shown in FIG. 2. Similarly, the gate 108-2 may extend between the proximate spacers 134 on the sides of the gate 106-2 and the gate 106-3 along the longitudinal axis of the trench 103. In some embodiments in which the gate dielectric 114 is not a layer shared commonly between the gates 108 and 106, but instead is separately deposited in the trench 103 between the spacers 134, the gate dielectric 114 may extend at least partially up the sides of the spacers 134 (and up the proximate sidewalls of the trench 103), and the gate metal 112 may extend between the portions of gate dielectric 114 on the spacers 134 (and the proximate sidewalls of the trench 103). As illustrated in FIG. 3, in some embodiments, no spacer material may be disposed between the gate metal 112 and the sidewalls of the trench 103 in the y-direction; in other embodiments (not shown in the present drawings), spacers 134 may also be disposed between the gate metal 112 and the sidewalls of the trench 103 in the y-direction.

The dimensions of the gates 106/108 may take any suitable values. For example, in some embodiments, the z-height 166 of the gate metal 110 in the trench 103 may be between about 100 nanometers and 400 nanometers (e.g., approximately about 200 nanometers); the z-height 175 of the gate metal 112 may be in about the same range. This z-height 166 of the gate metal 110 in the trench 103 may represent the sum of the z-height of the first gate metal layer 110A (e.g., between about 40 nanometers and 300 nanometers) and the thickness of the second gate metal layer 110B (e.g., between about 25 nanometers and 100 nanometers, or approximately 50 nanometers). In embodiments like the ones illustrated in FIGS. 1-3, the z-height 175 of the gate metal 112 may be greater than the z-height 166 of the gate metal 110 (as can be seen in, e.g., FIG. 2). In some embodiments, the length 168 of the gate metal 110 (i.e., in the x-direction) may be between about 20 nanometers and 50 nanometers (e.g., about 30 nanometers). Although all of the gates 106 are illustrated in the accompanying drawings as having the same length 168 of the gate metal 110, in some embodiments, the "outermost" gates 106 (e.g., the gates 106-1 and 106-3 of the embodiment illustrated in FIG. 2) may have a greater length 168 than the "inner" gates 106 (e.g., the gate 106-2 in the embodiment illustrated in FIG. 2). Such longer "outside" gates 106 may provide spatial separation between the doped regions 140 and the areas under the gates 108 and the inner gates 106 in which quantum dots 142 may form, and thus may reduce the perturbations to the potential energy landscape under the gates 108 and the inner gates 106 caused by the doped regions 140.

In some embodiments, the distance 170 between adjacent ones of the gates 106 (e.g., as measured from the gate metal 110 of one gate 106 to the gate metal 110 of an adjacent gate 106 in the x-direction, as illustrated in FIG. 2) may be between about 40 nanometers and 100 nanometers (e.g., about 50 nanometers). In some embodiments, the thickness 172 of the spacers 134 may be between about 1 nanometer and 10 nanometers (e.g., between about 3 nanometers and 5 nanometers, between about 4 nanometers and 6 nanometers, or between about 4 nanometers and 7 nanometers). The length of the gate metal 112 (i.e., in the x-direction) may depend on the dimensions of the gates 106 and the spacers 134, as illustrated in FIG. 2. As indicated in FIGS. 1 and 3, the gates 106/108 in one trench 103 may extend over the insulating material 128 between that trench 103 and an adjacent trench 103 but may be isolated from their counterpart gates by the intervening insulating material 130 and spacers 134.

As shown in FIG. 2, the gates 106 and 108 may be alternatingly arranged in the x-direction. During operation of the quantum dot device 100, voltages may be applied to the gates 106/108 to adjust the potential energy in the quantum well stack 146 to create quantum wells of varying depths in which quantum dots 142 may form. Only one quantum dot 142 is labeled with a reference numeral in FIGS. 2 and 4 for ease of illustration, but five are indicated as dotted circles below each trench 103. The location of the quantum dots 142 in FIGS. 2 and 4 is not intended to indicate a particular geometric positioning of the quantum dots 142. The spacers 134 (and the insulating material 128) may themselves provide "passive" barriers between quantum dots under the gates 106/108 in the quantum well stack 146, and the voltages applied to different ones of the gates 106/108 may adjust the potential energy under the gates 106/108 in the quantum well stack 146; decreasing the potential energy under a gate 106/108 may enable the formation of a quantum dot under that gate 106/108, while increasing the potential energy under a gate 106/108 may form a quantum barrier under that gate 106/108.

The quantum well stack 146 may include doped regions 140 that may serve as a reservoir of charge carriers for the quantum dot device 100. For example, an n-type doped region 140 may supply electrons for electron-type quantum dots 142, and a p-type doped region 140 may supply holes for hole-type quantum dots 142. In some embodiments, an interface material 141 may be disposed at a surface of a doped region 140, as shown. The interface material 141 may facilitate electrical coupling between a conductive contact (e.g., a conductive via 136, as discussed below) and the doped region 140. The interface material 141 may be any suitable metal-semiconductor ohmic contact material; for example, in embodiments in which the doped region 140 includes silicon, the interface material 141 may include nickel silicide, aluminum silicide, titanium silicide, molybdenum silicide, cobalt silicide, tungsten silicide, or platinum silicide. In some embodiments, the interface material 141 may be a non-silicide compound, such as titanium nitride. In some embodiments, the interface material 141 may be a metal (e.g., aluminum, tungsten, or indium).

The quantum dot devices 100 disclosed herein may be used to form electron-type or hole-type quantum dots 142. Note that the polarity of the voltages applied to the gates 106/108 to form quantum wells/barriers depends on the charge carriers used in the quantum dot device 100. In embodiments in which the charge carriers are electrons (and thus the quantum dots 142 are electron-type quantum dots), amply negative voltages applied to a gate 106/108 may increase the potential barrier under the gate 106/108, and amply positive voltages applied to a gate 106/108 may decrease the potential barrier under the gate 106/108 (thereby forming a potential well in which an electron-type quantum dot 142 may form). In embodiments in which the charge carriers are holes (and thus the quantum dots 142 are hole-type quantum dots), amply positive voltages applied to a gate 106/108 may increase the potential barrier under the gate 106/108, and amply negative voltages applied to a gate 106 and 108 may decrease the potential barrier under the gate 106/108 (thereby forming a potential well in which a hole-type quantum dot 142 may form). The quantum dot devices 100 disclosed herein may be used to form electron-type or hole-type quantum dots.

Voltages may be applied to each of the gates 106 and 108 separately to adjust the potential energy in the quantum well stack 146 under the gates 106 and 108, and thereby control the formation of quantum dots 142 under each of the gates 106 and 108. Additionally, the relative potential energy profiles under different ones of the gates 106 and 108 allow the quantum dot device 100 to tune the potential interaction between quantum dots 142 under adjacent gates. For example, if two adjacent quantum dots 142 (e.g., one quantum dot 142 under a gate 106 and another quantum dot 142 under an adjacent gate 108) are separated by only a short potential barrier, the two quantum dots 142 may interact more strongly than if they were separated by a taller potential barrier. Since the depth of the potential wells/height of the potential barriers under each gate 106/108 may be adjusted by adjusting the voltages on the respective gates 106/108, the differences in potential between adjacent gates 106/108 may be adjusted, and thus the interaction tuned.

In some applications, the gates 108 may be used as plunger gates to enable the formation of quantum dots 142 under the gates 108, while the gates 106 may be used as barrier gates to adjust the potential barrier between quantum dots 142 formed under adjacent gates 108. In other applications, the gates 108 may be used as barrier gates, while the gates 106 are used as plunger gates. In other applications, quantum dots 142 may be formed under all of the gates 106 and 108, or under any desired subset of the gates 106 and 108.

Conductive vias and lines may make contact with the gates 106/108, and to the doped regions 140, to enable electrical connection to the gates 106/108 and the doped regions 140 to be made in desired locations. As shown in FIGS. 1-4, the gates 106 may extend both "vertically" and "horizontally" away from the quantum well stack 146, and conductive vias 120 may contact the gates 106 (and are drawn in dashed lines in FIG. 2 to indicate their location behind the plane of the drawing). The conductive vias 120 may extend through the hardmask 116 and the hardmask 118 to contact the gate metal 110 of the gates 106. The gates 108 may similarly extend away from the quantum well stack 146, and conductive vias 122 may contact the gates 108 (also drawn in dashed lines in FIG. 2 to indicate their location behind the plane of the drawing). The conductive vias 122 may extend through the hardmask 118 to contact the gate metal 112 of the gates 108. Conductive vias 136 may contact the interface material 141 and may thereby make electrical contact with the doped regions 140. The quantum dot device 100 may include further conductive vias and/or lines (not shown) to make electrical contact to the gates 106/108 and/or the doped regions 140, as desired. The conductive vias and lines included in a quantum dot device 100 may include any suitable materials, such as copper, tungsten (deposited, e.g., by CVD), or a superconductor (e.g., aluminum, tin, titanium nitride, niobium titanium nitride, tantalum, niobium, or other niobium compounds such as niobium tin and niobium germanium).

During operation, a bias voltage may be applied to the doped regions 140 (e.g., via the conductive vias 136 and the interface material 141) to cause current to flow through the doped regions 140 and through a quantum well layer of the quantum well stack 146. When the doped regions 140 are doped with an n-type material, this voltage may be positive; when the doped regions 140 are doped with a p-type material, this voltage may be negative. The magnitude of this bias voltage may take any suitable value (e.g., between about 0.25 volts and 2 volts).

In some embodiments, the quantum dot device 100 may include one or more magnet lines 121. For example, a single magnet line 121 is illustrated in FIGS. 1-4, proximate to the trench 103-1. The magnet line 121 may be formed of a conductive material and may be used to conduct current pulses that generate magnetic fields to influence the spin states of one or more of the quantum dots 142 that may form in the quantum well stack 146. In some embodiments, the magnet line 121 may conduct a pulse to reset (or "scramble") nuclear and/or quantum dot spins. In some embodiments, the magnet line 121 may conduct a pulse to initialize an electron in a quantum dot in a particular spin state. In some embodiments, the magnet line 121 may conduct current to provide a continuous, oscillating magnetic field to which the spin of a qubit may couple. The magnet line 121 may provide any suitable combination of these embodiments, or any other appropriate functionality.

In some embodiments, the magnet line 121 may be formed of copper. In some embodiments, the magnet line 121 may be formed of a superconductor, such as aluminum. The magnet line 121 illustrated in FIGS. 1-4 is non-coplanar with the trenches 103, and is also non-coplanar with the gates 106/108. In some embodiments, the magnet line 121 may be spaced apart from the gates 106/108, in the direction of the z-axis of the example coordinate system shown, by a distance 167. The distance 167 may take any suitable value (e.g., based on the desired strength of magnetic field interaction with particular quantum dots 142); in some embodiments, the distance 167 may be between about 25 nanometers and 1 micron (e.g., between about 50 nanometers and 200 nanometers).

In some embodiments, the magnet line 121 may be formed of a magnetic material. For example, a magnetic material (such as cobalt) may be deposited in a trench in the insulating material 130 to provide a permanent magnetic field in the quantum dot device 100.

The magnet line 121 may have any suitable dimensions. For example, the magnet line 121 may have a thickness 169 between about 25 nanometers and 100 nanometers. The magnet line 121 may have a width 171 between about 25 nanometers and 100 nanometers. In some embodiments, the width 171 and thickness 169 of a magnet line 121 may be substantially equal to, respectively, the width and thickness of other conductive lines in the quantum dot device 100 (not shown) used to provide electrical interconnects, as known in the art. The magnet line 121 may have a length 173 that may depend on the number and dimensions of the gates 106/108 that are to form quantum dots 142 with which the magnet line 121 is to interact. The magnet line 121 illustrated in FIGS. 1-4 is substantially linear, but this need not be the case; in general, the magnet lines 121 of the quantum dot devices 100 may take any suitable shape. In other embodiments, micro-magnets may be used instead or in addition to the magnet line 121. Conductive vias 123 may contact the magnet line 121.

The conductive vias 120, 122, 136, and 123 may be electrically isolated from each other by an insulating material 130. The insulating material 130 may be any suitable material, such as an interlayer dielectric (ILD). Examples of the insulating material 130 may include silicon oxide, silicon nitride, aluminum oxide, carbon-doped oxide, and/or silicon oxynitride. As known in the art of IC manufacturing, conductive vias and lines may be formed in an iterative process in which layers of structures are formed on top of each other. In some embodiments, the conductive vias 120/122/136/123 may have a width that is about 20 nanometers or greater at their widest point (e.g., about 30 nanometers), and a pitch of about 80 nanometers or greater (e.g., about 100 nanometers). In some embodiments, conductive lines (not shown) included in the quantum dot device 100 may have a width that is about 100 nanometers or greater, and a pitch of about 100 nanometers or greater. The particular arrangement of conductive vias shown in FIGS. 1-4 is simply illustrative, and any electrical routing arrangement may be implemented.

As discussed above, the structure of the trench 103-1 may be the same as the structure of the trench 103-2; similarly, the construction of gates 106/108 in and around the trench 103-1 may be the same as the construction of gates 106/108 in and around the trench 103-2. The gates 106/108 associated with the trench 103-1 may be mirrored by corresponding gates 106/108 associated with the parallel trench 103-2, and the insulating material 130 may separate the gates 106/108 associated with the different trenches 103-1 and 103-2. In particular, quantum dots 142 formed in the quantum well stack 146 under the trench 103-1 (under the gates 106/108) may have counterpart quantum dots 142 in the quantum well stack 146 under the trench 103-2 (under the corresponding gates 106/108). In some embodiments, the quantum dots 142 under the trench 103-1 may be used as "active" quantum dots in the sense that these quantum dots 142 act as qubits and are controlled (e.g., by voltages applied to the gates 106/108 associated with the trench 103-1) to perform quantum computations. The quantum dots 142 associated with the trench 103-2 may be used as "read" quantum dots in the sense that these quantum dots 142 may sense the quantum state of the quantum dots 142 under the trench 103-1 by detecting the electric field generated by the charge in the quantum dots 142 under the trench 103-1, and may convert the quantum state of the quantum dots 142 under the trench 103-1 into electrical signals that may be detected by the gates 106/108 associated with the trench 103-2. Each quantum dot 142 under the trench 103-1 may be read by its corresponding quantum dot 142 under the trench 103-2. Thus, the quantum dot device 100 enables both quantum computation and the ability to read the results of a quantum computation.

FIGS. 5-15 are cross-sectional views of alternative implementations of quantum dot devices with conductive liners, in accordance with various embodiments. Each of FIGS. 5-15 provides a view of the quantum dot device 100 similar to that shown in FIG. 1 but with some alterations compared to FIG. 1. Other views of the quantum dot device 100 (such as the ones shown in FIGS. 2-4) may then be easily envisioned based on the explanations of FIGS. 1-4 and each of FIGS. 5-15.

Figure 5:
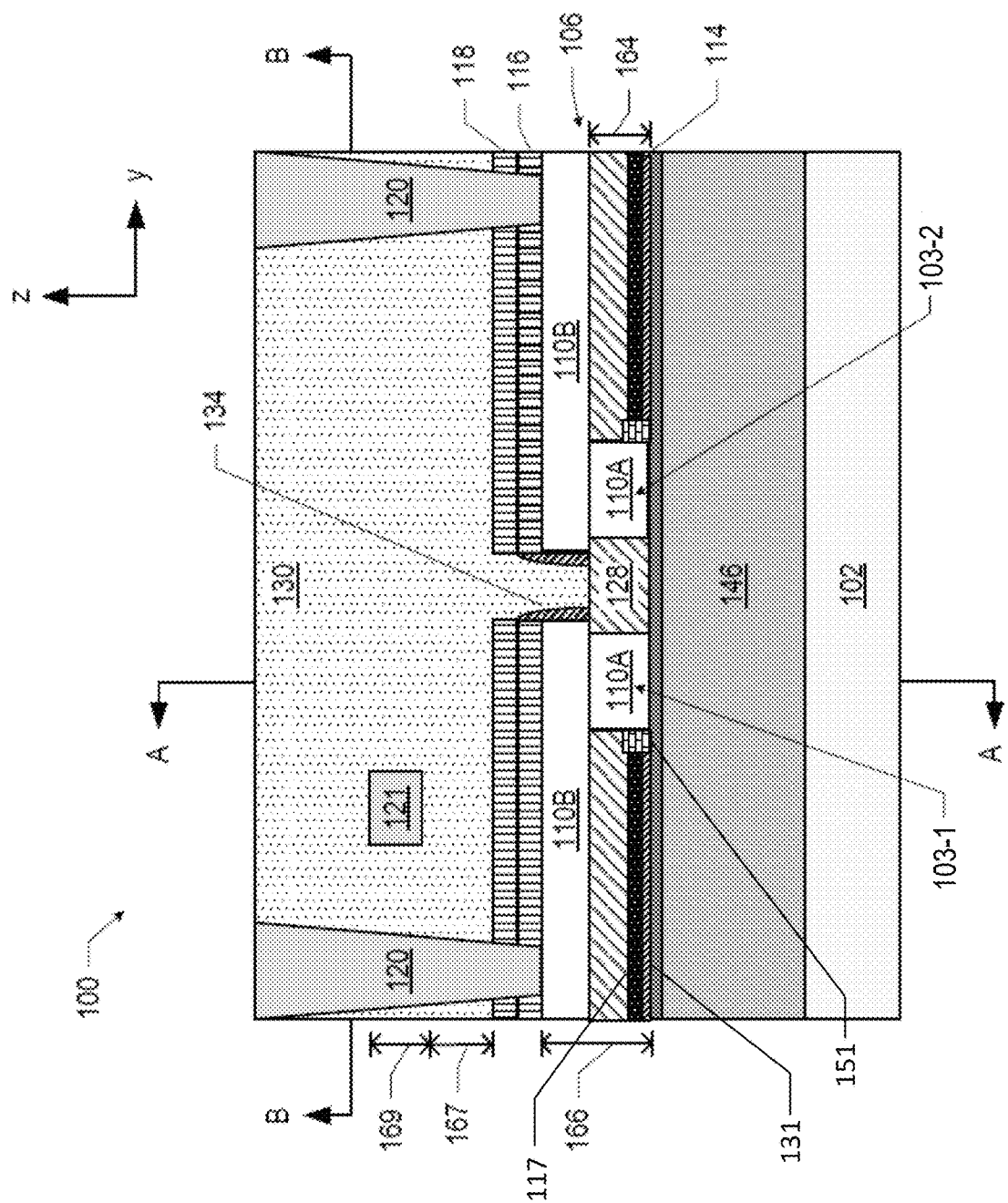
FIGS. 5-15 are cross-sectional views of alternative implementations of quantum dot devices, in accordance with various embodiments.

FIG. 5 illustrates an embodiment of the quantum dot device 100 as shown in FIG. 1, except that no conductive material 117 is present between the trenches 103-1 and 103-2. In some such embodiments, the intervening material 131 may similarly be absent between the trenches 103-1 and 103-2 and/or the dielectric materials 151 may similarly be absent between the trenches 103-1 and 103-2, as shown in FIG. 5. Such embodiments may be particularly advantageous because they allow placing another gate in between the trenches 103-1 and 103-2, e.g., to further carefully control electrostatics in the quantum dot device 100 (e.g., to control coupling between the quantum dots 142 formed under different ones of the gates in the trenches 103-1 and 103-2).

Figure 6:
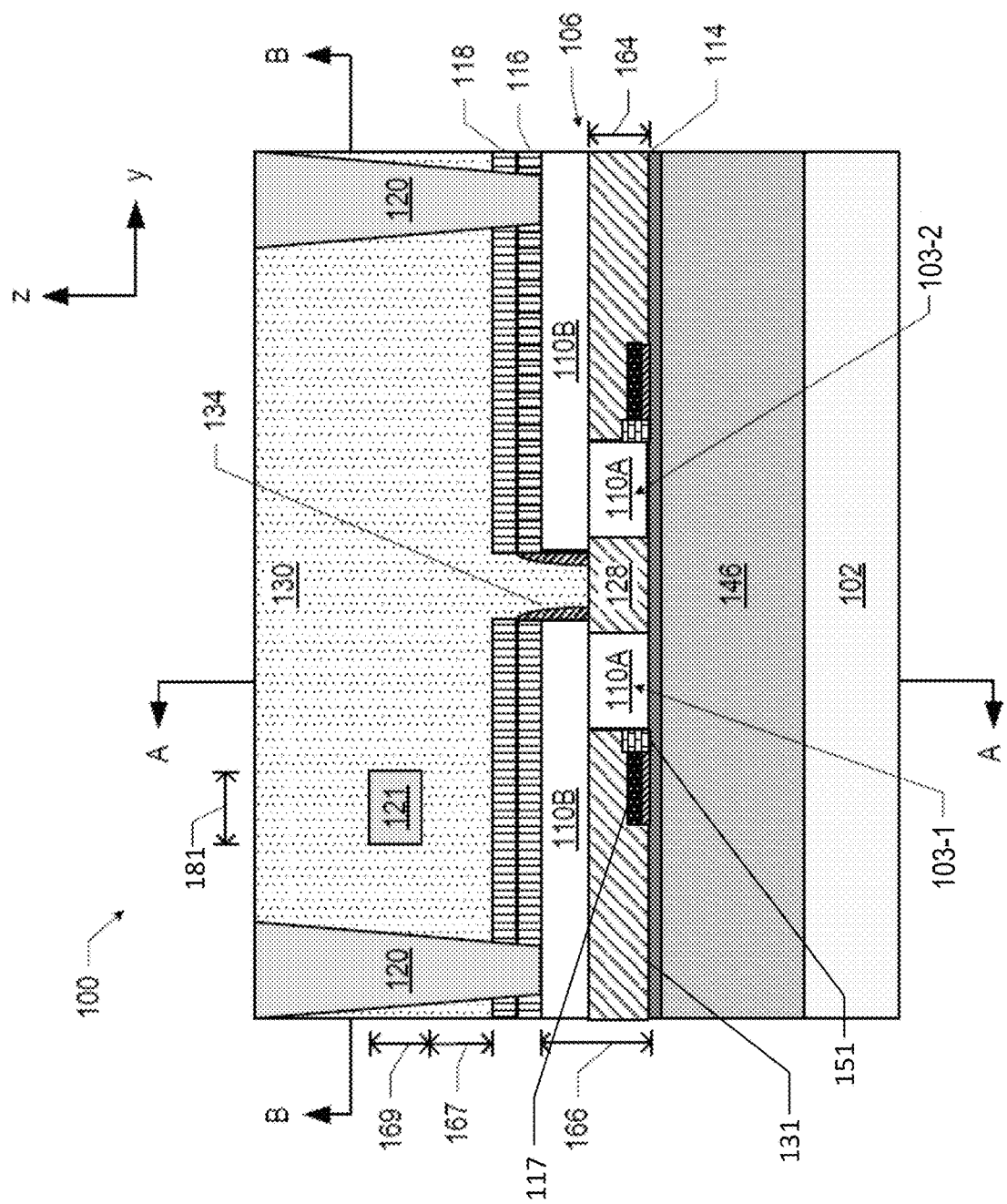

FIG. 6 illustrates an embodiment of the quantum dot device 100 as shown in FIG. 5, except that the conductive material 117 on either side of the trenches 103 is patterned to be narrower than what is shown in FIG. 5. A top-down view of such an embodiment is shown in FIG. 16D, described below. For example, the conductive material 117 on either side of the trenches 103 may have a width 181 between about 5 nanometers and 500 nanometers, e.g., between about 10 nanometers and 400 nanometers or between about 20 nanometers and 300 nanometers. One advantage of such implementation may be that the liners of the conductive material 117 are only present in locations where their presence has the most impact for controlling electrostatics of the quantum dot device 100 and are absent in other locations.

Figure 7:
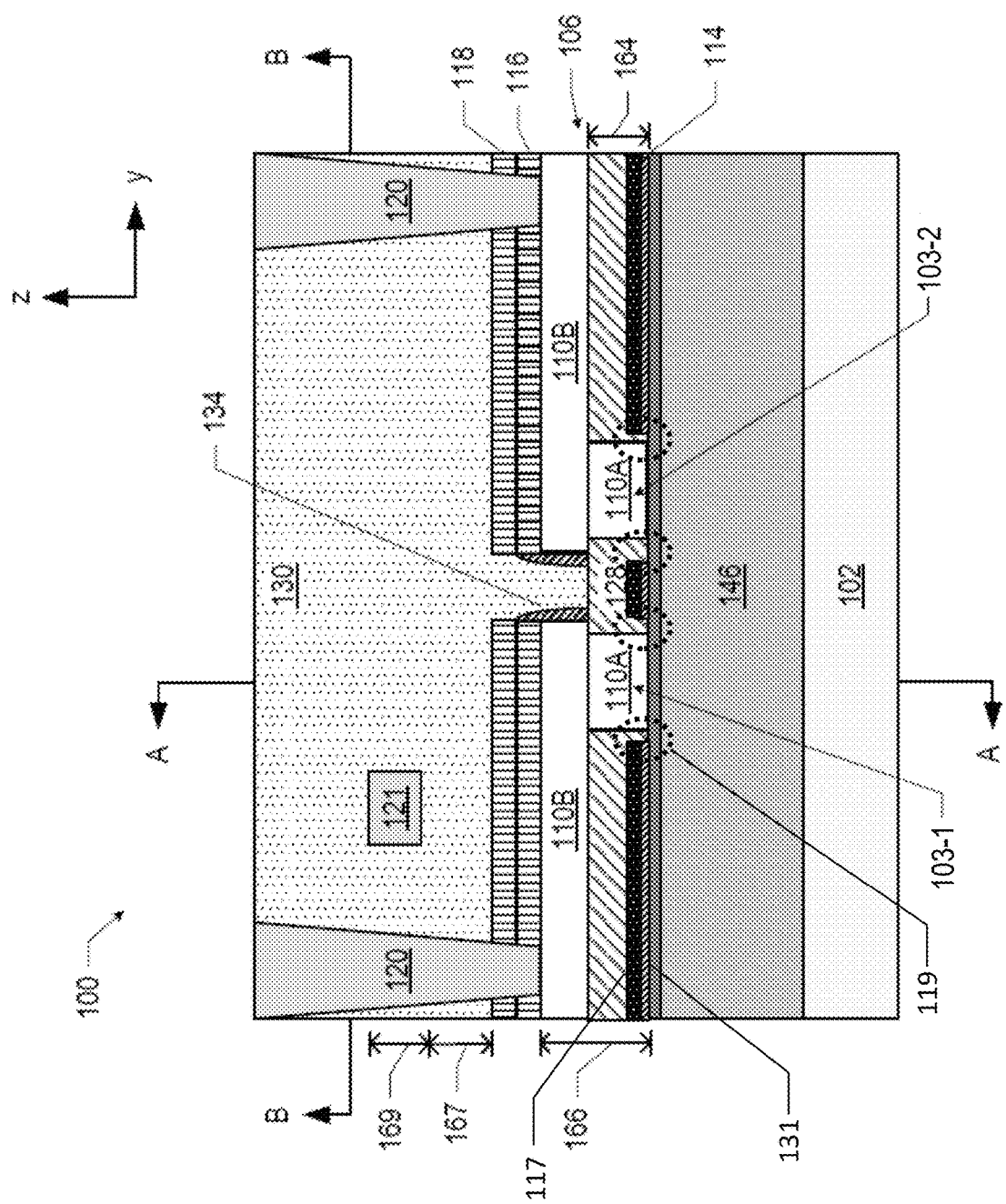

FIG. 7 illustrates an embodiment of the quantum dot device 100 as shown in FIG. 1, except that no dielectric material 151 is used to electrically isolate the gate metal 110/112 from the conductive material 117. Instead, the gate metal 110/112 is spaced apart from the conductive material 117 by the insulating material 128, e.g., as illustrated with gaps 119, shown in FIG. 7 within dotted ovals. Only one of the gaps 119 are labeled with a reference numeral, in order to not clutter the drawing, while four such gaps 119 are indicated in FIG. 7 with the dotted ovals. Such an embodiment may be a result of a subtractive fabrication approach that may be used to form the liners of conductive material 117, which fabrication approach may be advantageous in terms of its relative simplicity. In some embodiments, the width of the gaps 119 (i.e., dimension measured along the y-axis of the example coordinate system shown in the present drawings) may be between about 1 nanometer and 100 nanometers, e.g., between about 3 nanometers and 75 nanometers or between about 5 nanometers and 50 nanometers.

Figure 8:
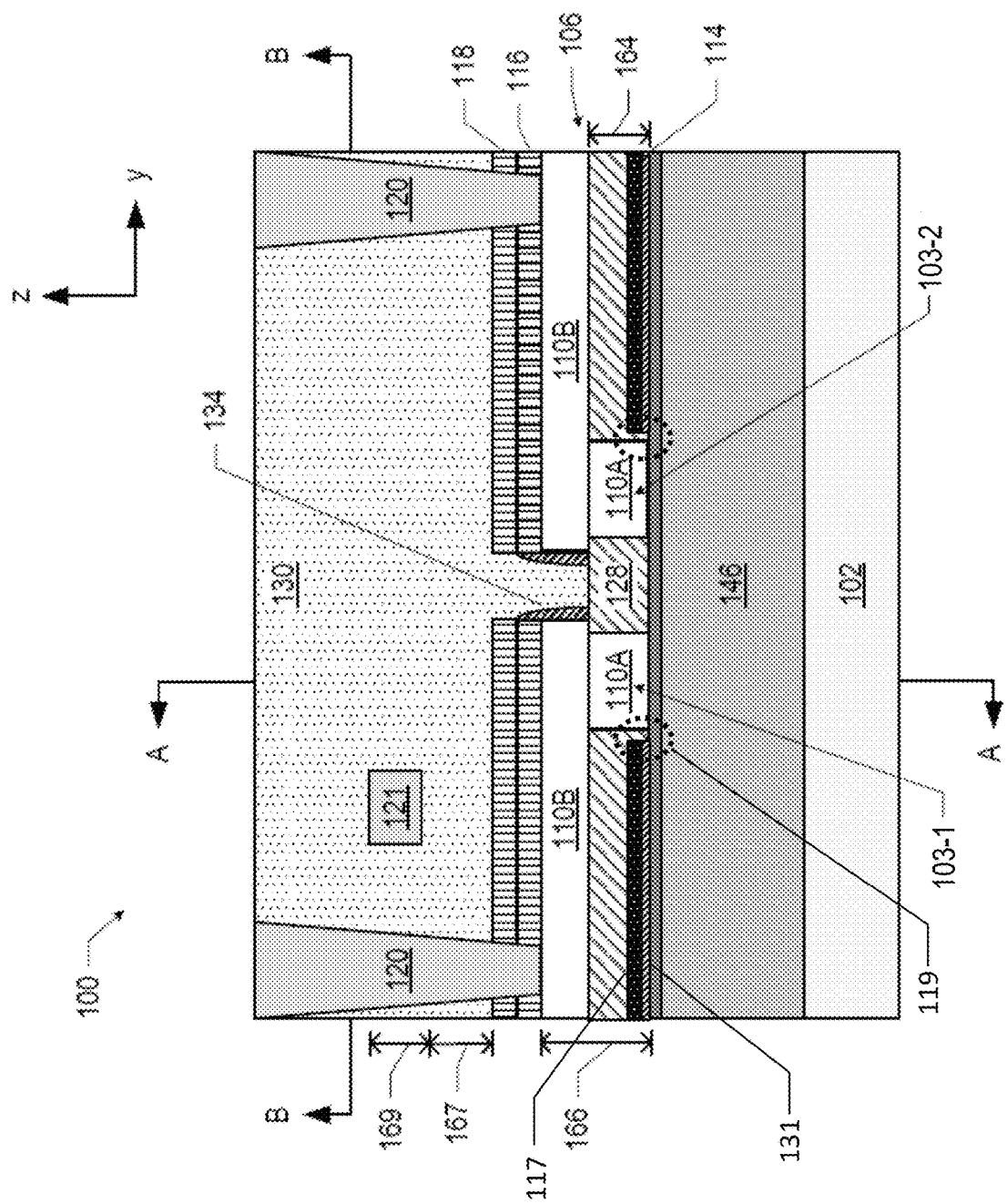

FIG. 8 illustrates an embodiment of the quantum dot device 100 as shown in FIG. 7, except that no conductive material 117 is present between the trenches 103-1 and 103-2, as was described with reference to FIG. 5. Thus, the embodiment shown in FIG. 8 may combine advantages of the embodiment described with reference to FIG. 7 and the embodiment described with reference to FIG. 5.

Figure 9:
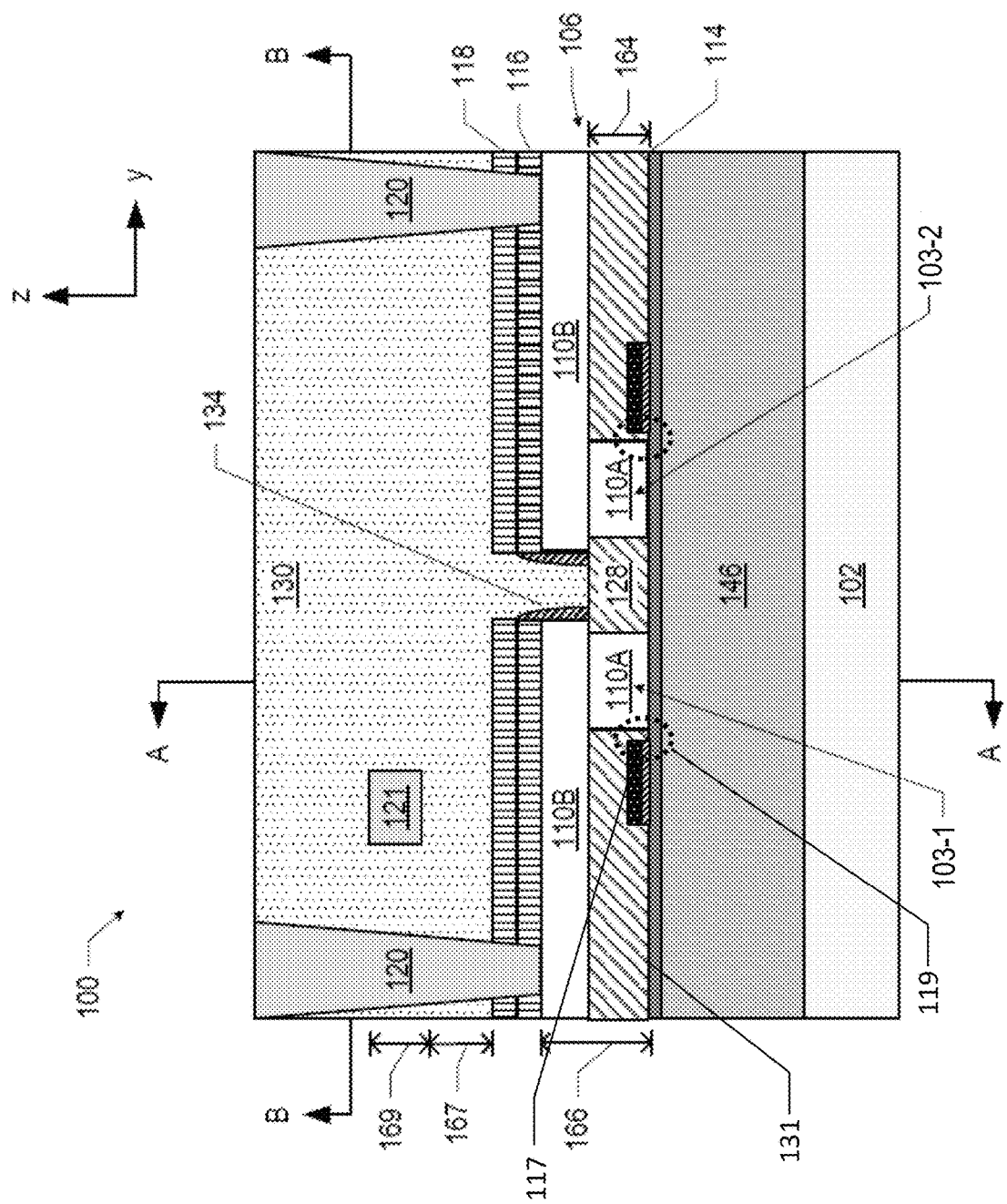

FIG. 9 illustrates an embodiment of the quantum dot device 100 as shown in FIG. 8, except that the conductive material 117 on either side of the trench is patterned to be narrower than what is shown in FIG. 8, as was described with reference to FIG. 6. Thus, the embodiment shown in FIG. 9 may combine advantages of the embodiment described with reference to FIG. 8 and the embodiment described with reference to FIG. 6.

Figure 10:
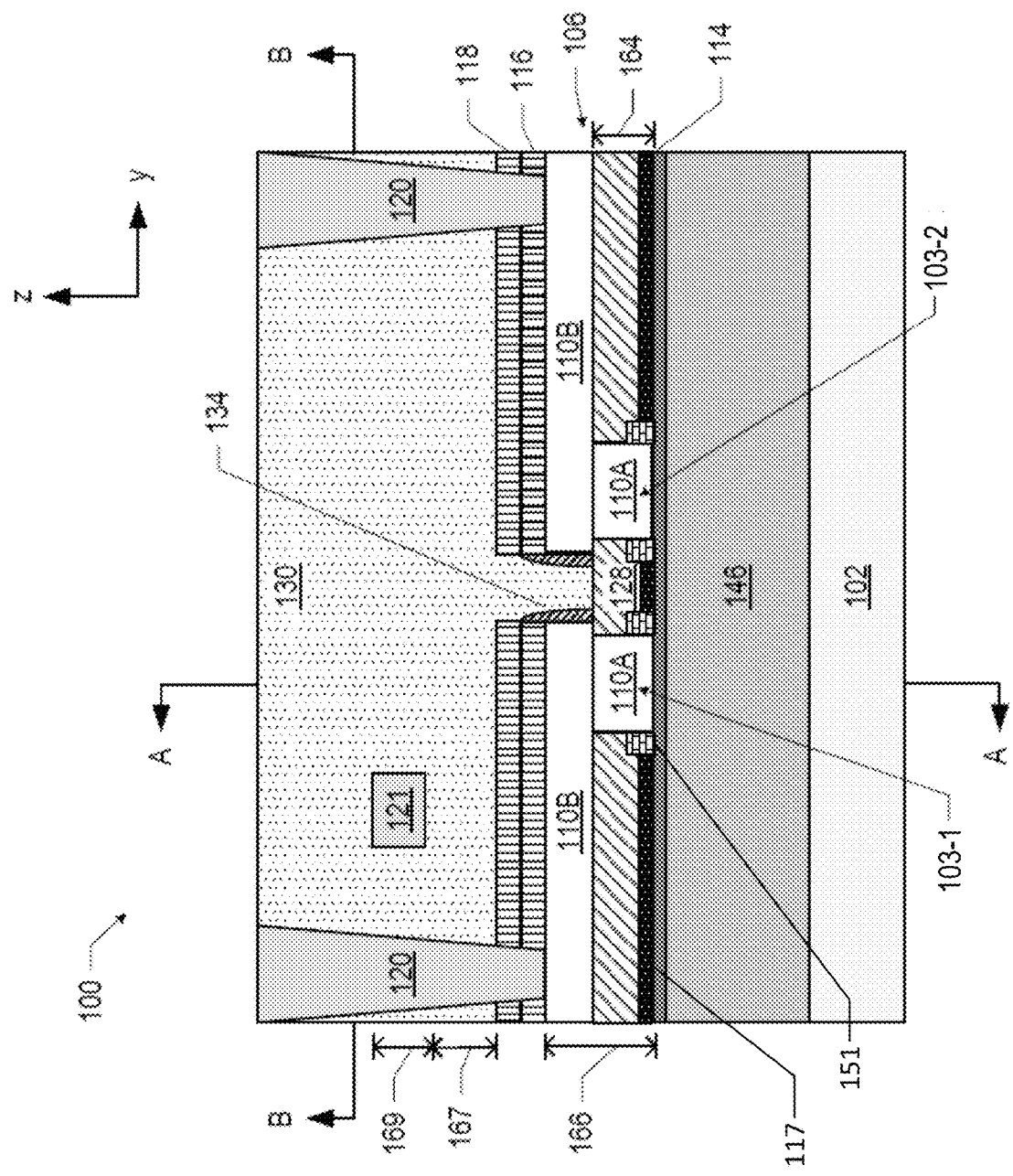

FIG. 10 illustrates an embodiment of the quantum dot device 100 as shown in FIG. 1, except that the intervening material 131 is absent. In such embodiments, the insulating material 128 may be spaced away from the gate dielectric 114 by the conductive material 117. In some embodiments, the conductive material 117 may be in contact with the gate dielectric 114 on one side and/or in contact with the insulating material 128 on the other side, as shown in FIG. 10. In other embodiments, the gate dielectric 114 may not be used and the conductive material 117 may be in contact with the quantum well stack 146 on one side and/or in contact with the insulating material 128 on the other side (not specifically shown in the present drawings). In all of these embodiments, the conductive material 117 is at the bottom of the insulating material 128, proximate to the top surface of the quantum well stack 146. Not including the intervening material 131 in the quantum dot device 100 may advantageously allow better control of the electrostatics of the quantum dot device 100 because it allows placing the conductive material 117 closer to the quantum well stack 146 and, therefore, closer to the area where the quantum dots 142 are formed.

Figure 11:
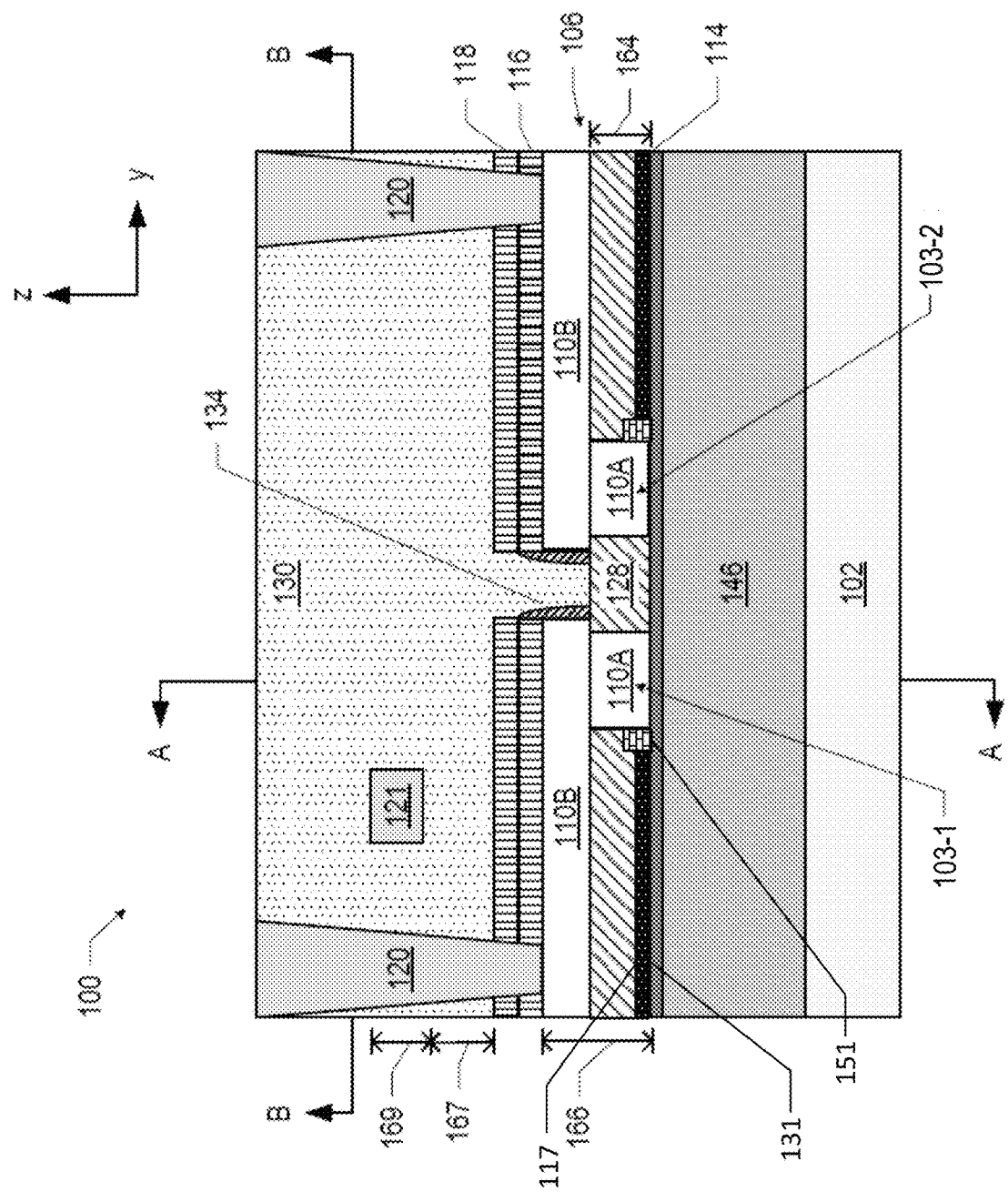

FIG. 11 illustrates an embodiment of the quantum dot device 100 as shown in FIG. 10, except that no conductive material 117 is present between the trenches 103-1 and 103-2 as was shown in FIG. 10. Lack of conductive material 117 between the trenches 103-1 and 103-2 was described with reference to FIG. 5 and FIG. 8. Thus, the embodiment shown in FIG. 11 may combine advantages of the embodiment described with reference to FIG. 10 and the embodiment described with reference to FIG. 5 or FIG. 8.

Figure 12:
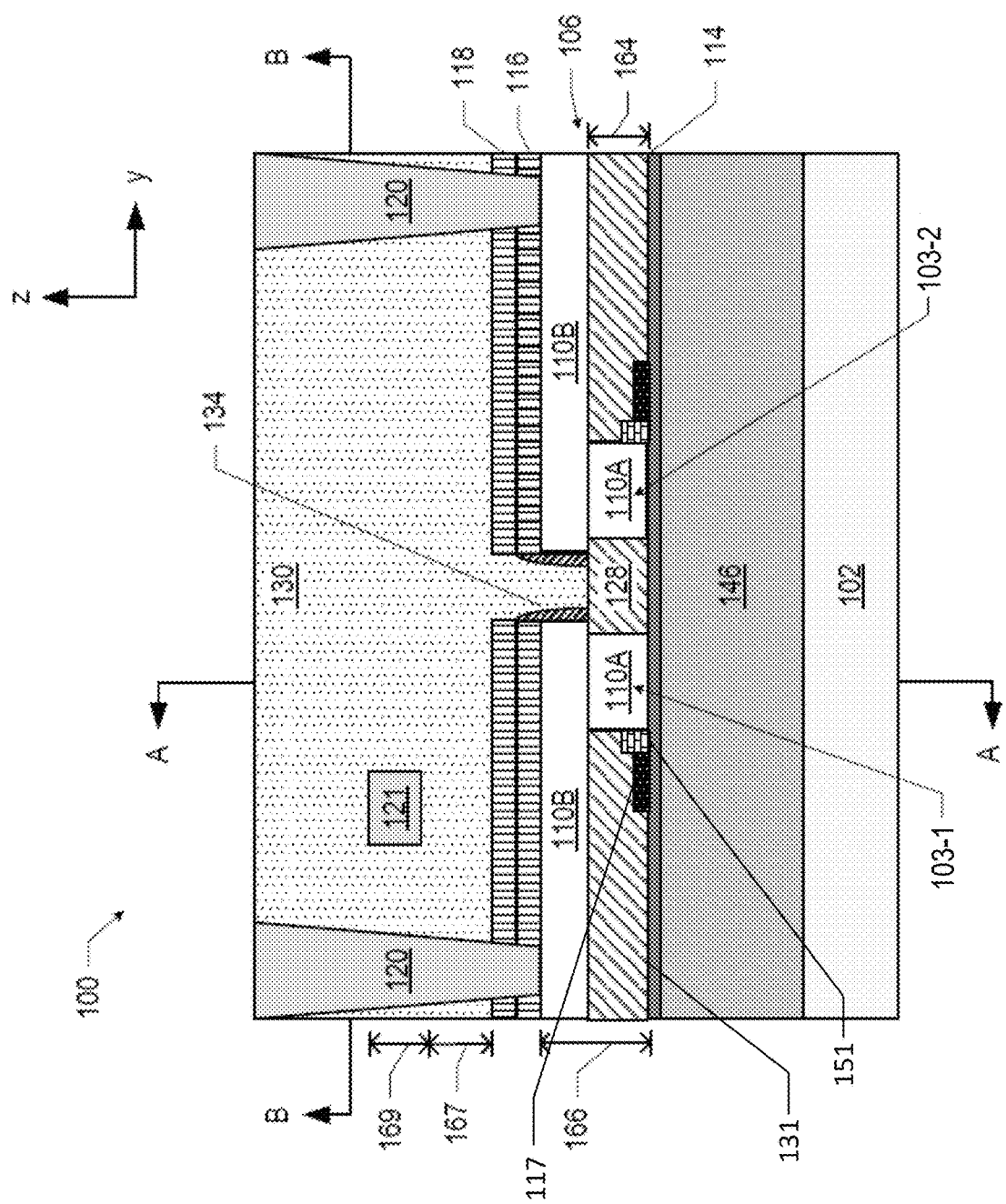

FIG. 12 illustrates an embodiment of the quantum dot device 100 as shown in FIG. 11, except that the conductive material 117 on either side of the trenches 103 is patterned to be narrower than what is shown in FIG. 11, as was described with reference to FIG. 6. Thus, the embodiment shown in FIG. 12 may combine advantages of the embodiment described with reference to FIG. 11 and the embodiment described with reference to FIG. 6 or FIG. 9.

Figure 13:
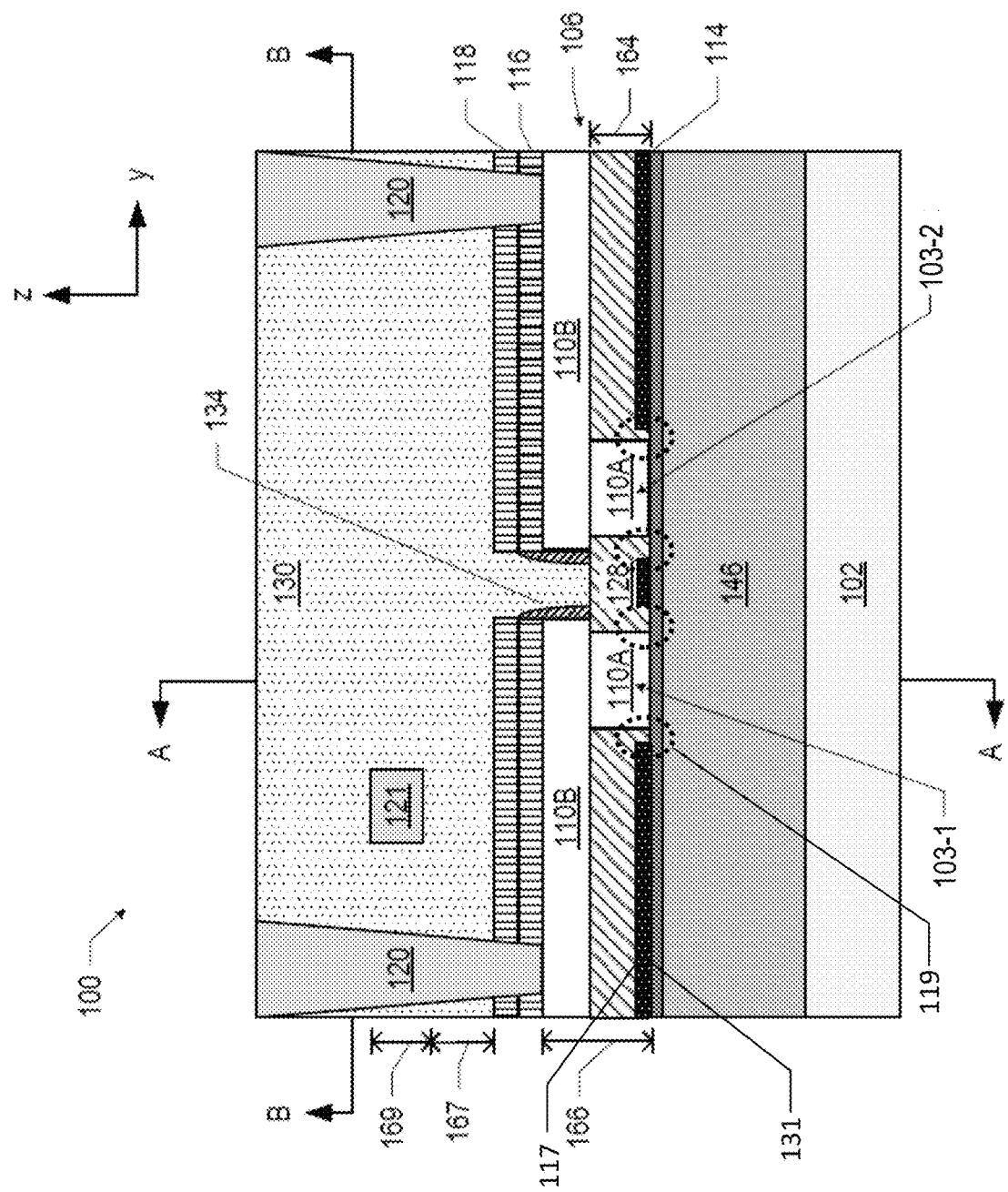

FIG. 13 illustrates an embodiment of the quantum dot device 100 as shown in FIG. 1, except that the intervening material 131 is absent as in FIG. 10 and the dielectric material 151 absent as well and, instead, the gate metal 110/112 is spaced apart from the conductive material 117 by the gaps 119 filled with the insulating material 128 as in FIG. 7.

Figure 14:
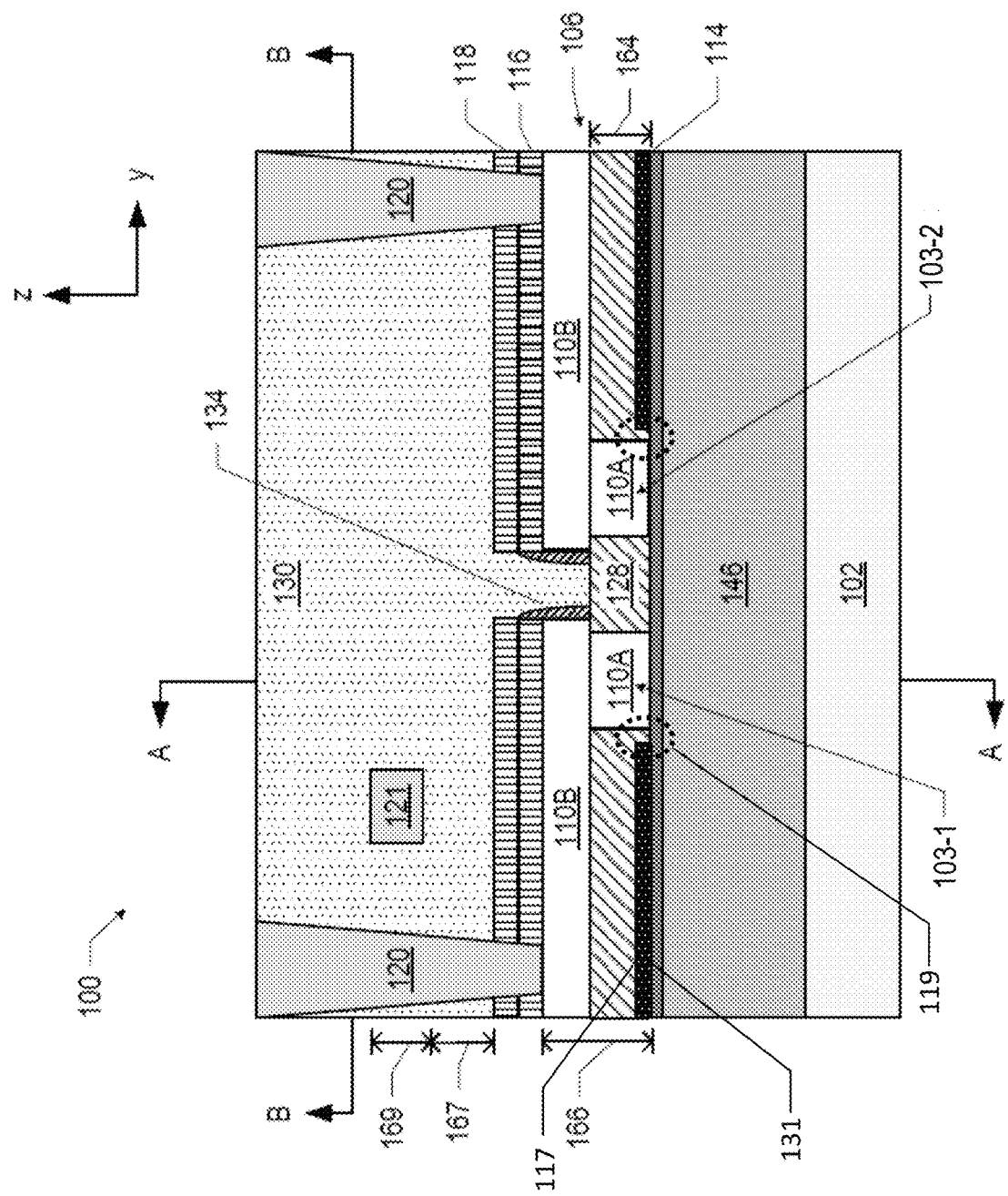

FIG. 14 illustrates an embodiment of the quantum dot device 100 as shown in FIG. 13, except that no conductive material 117 is present between the trenches 103-1 and 103-2 as was shown in FIG. 13. Lack of conductive material 117 between the trenches 103-1 and 103-2 was described with reference to FIG. 5, FIG. 8, and FIG. 11. Thus, the embodiment shown in FIG. 14 may combine advantages of the embodiment described with reference to FIG. 13 and the embodiment described with reference to FIG. 5 or FIG. 8 or FIG. 11.

Figure 15:
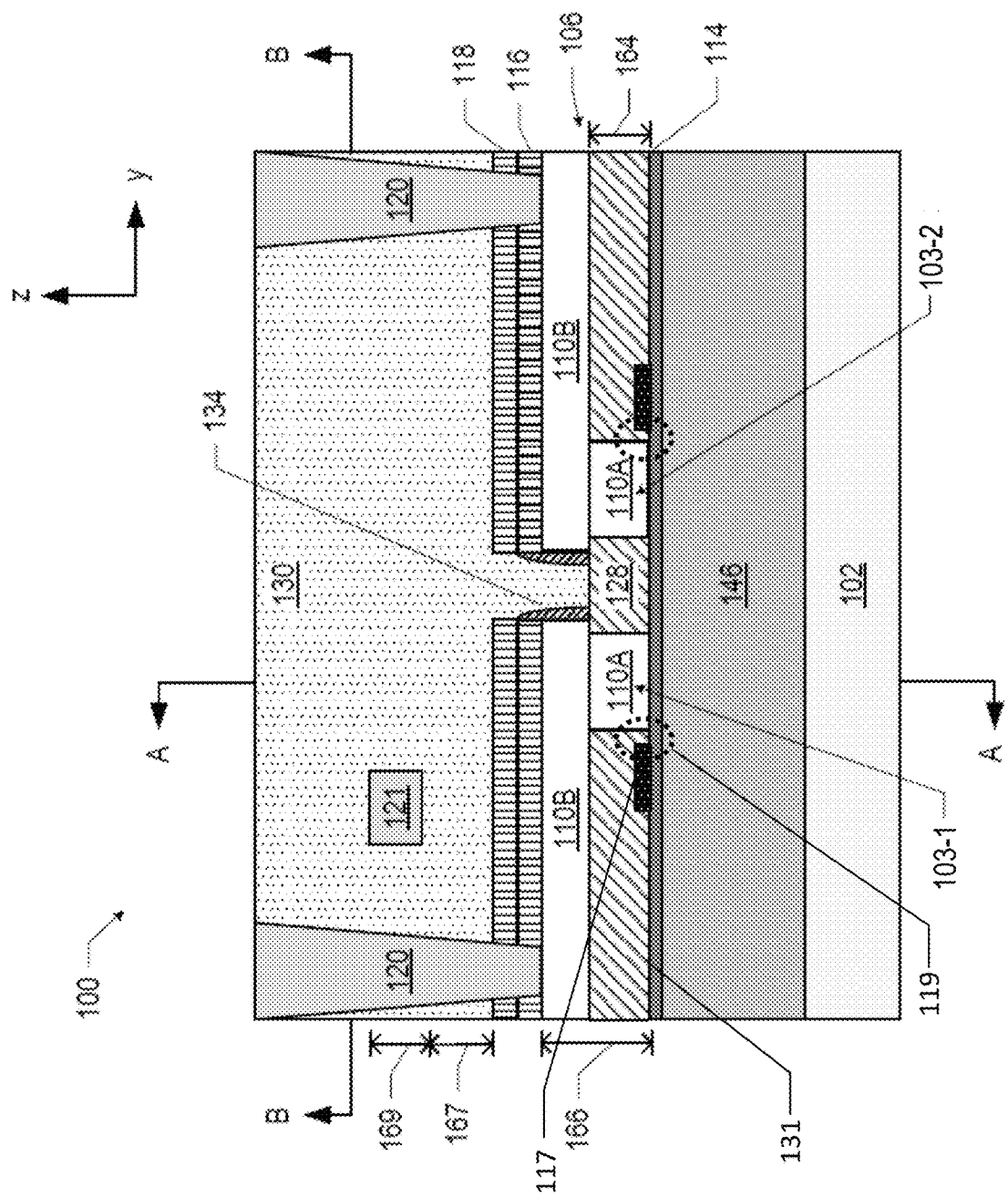

FIG. 15 illustrates an embodiment of the quantum dot device 100 as shown in FIG. 14, except that the conductive material 117 on either side of the trenches 103 is patterned to be narrower than what is shown in FIG. 14. Narrower conductive liners of the conductive material 117 on either side of the trenches 103 were described with reference to FIG. 6, FIG. 9, and FIG. 12. Thus, the embodiment shown in FIG. 15 may combine advantages of the embodiment described with reference to FIG. 14 and the FIG. 6 or FIG. 9 or FIG. 12.

FIGS. 16A-16E illustrate different views of a quantum dot device 100 with different arrangements of conductive liners, in accordance with various embodiments. In particular, FIGS. 16A-16D are top cross-sectional views providing illustrations similar to FIG. 4 but overlaying the conductive liners of the conductive material 117 over the view of FIG. 4 in order to show various layouts of the conductive material 117 with respect to other elements shown in FIG. 4.

Figure 16A:
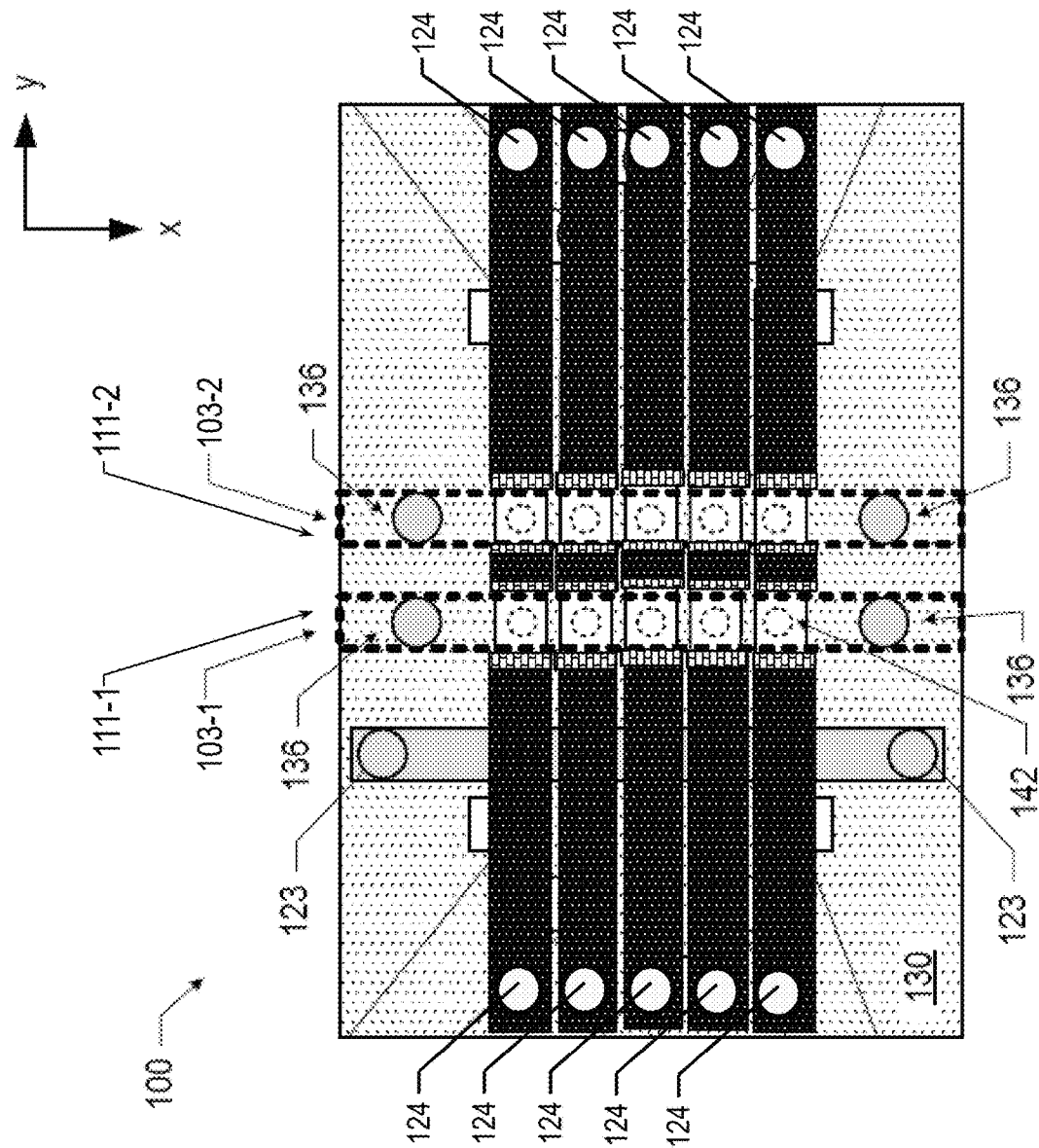
FIGS. 16A-16E illustrate different views of a quantum dot device with different arrangements of conductive liners, in accordance with various embodiments.

FIG. 16A illustrates that the liners of conductive material 117 may extend substantially parallel the corresponding lines of the gate metal 110/112, e.g., be stacked over the lines of the gate metal 110/112. Comparison of FIG. 16A and FIG. 4 reveals that the embodiment of FIG. 16A illustrates that the lines of conductive material 117 may be wider than the lines of the gate metal 110/112. FIG. 16A further illustrates conductive vias 124 that may extend through the insulating material 130 and contact individual conductive liners of the conductive material 117, thereby making electrical contact with the individual conductive liners of the conductive material 117.

Figure 16B:
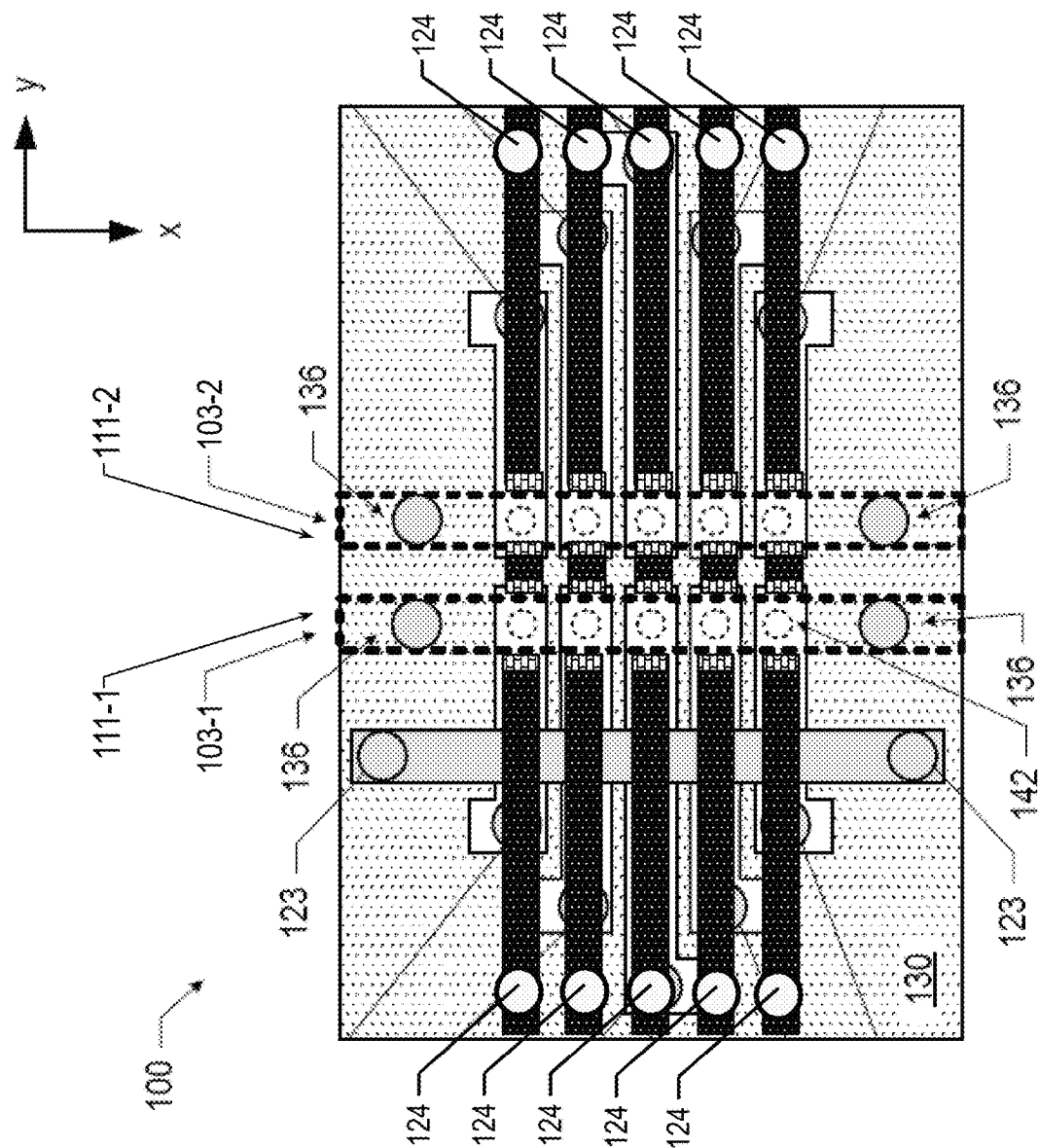

FIG. 16B illustrates an embodiment similar to that shown in FIG. 16A but with the lines of conductive material 117 being narrower than the lines of the gate metal 110/112.

Figure 16C:
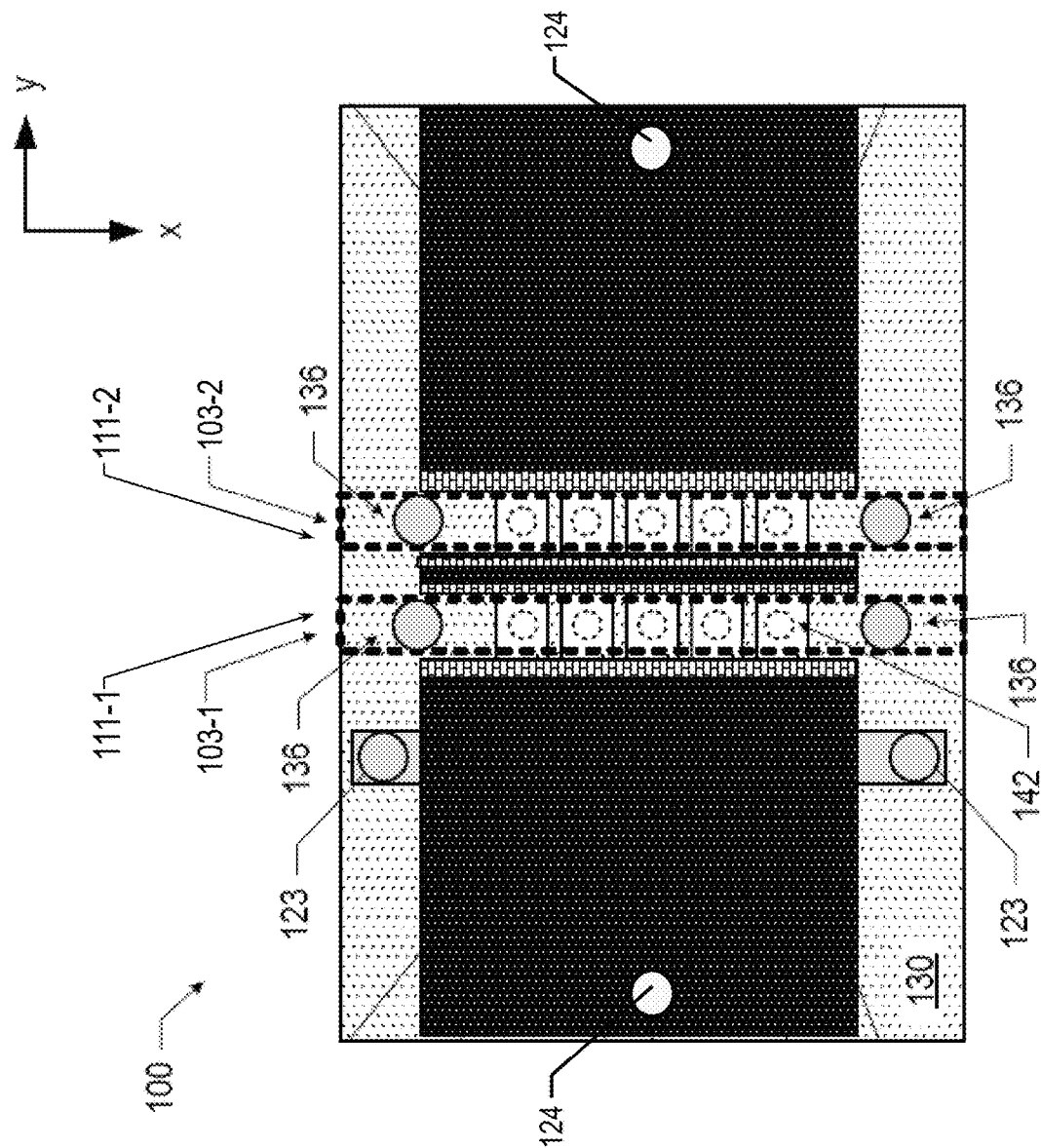
Figure 16D:
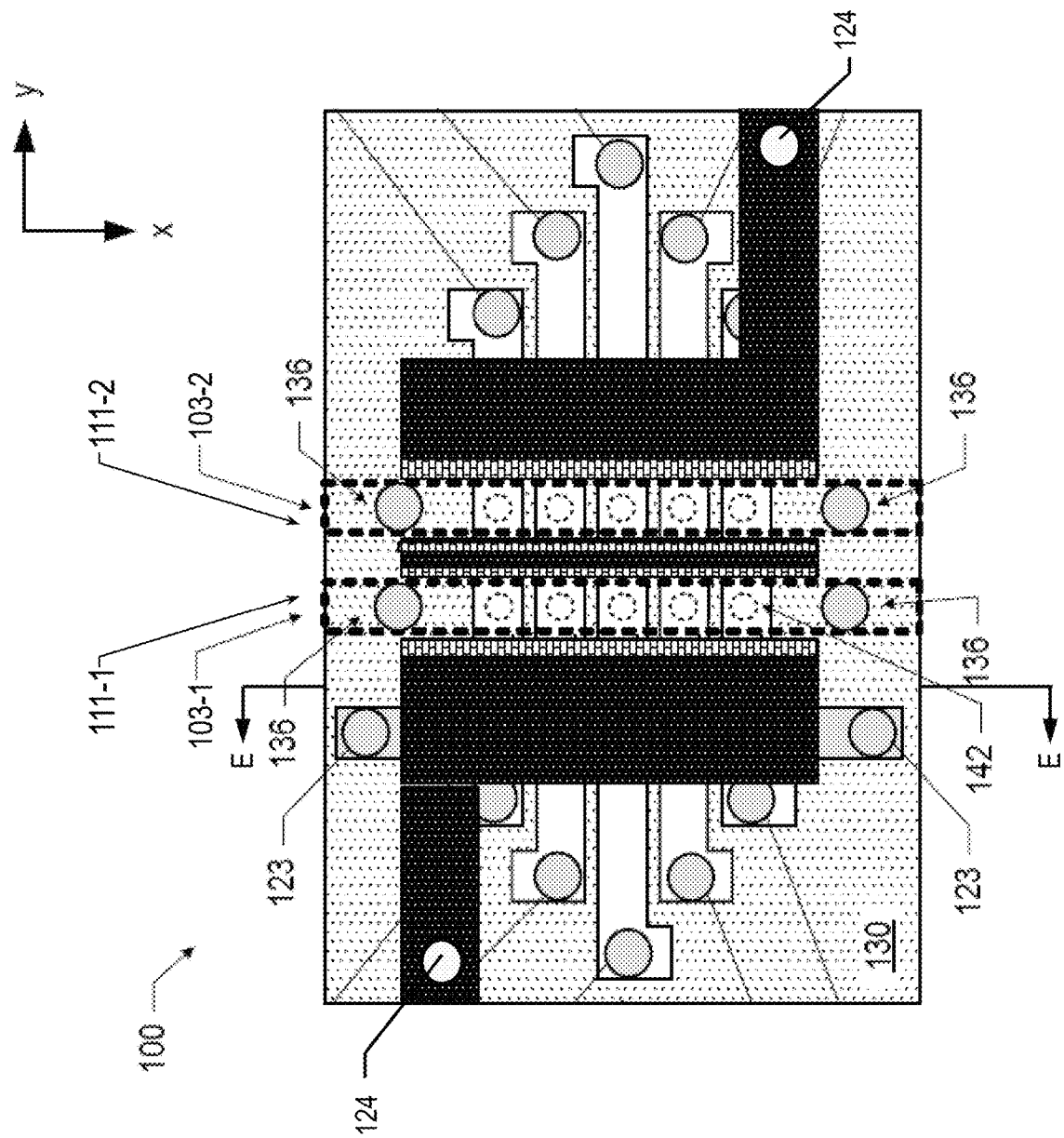

FIG. 16C illustrates an embodiment where, for a set of gates extending into one of the trenches 103, the conductive material 117 may be materially continuous as not patterned into individual lines as shown in FIG. 16A and FIG. 16B. In such an embodiment, only one conductive via 124 may be provided for a conductive liner of the conductive material 117 on either side of the trenches 103.

FIG. 16D illustrates an embodiment similar to FIG. 16C but showing that the conductive material 117 that is materially continuous across various gate lines corresponding to a given trench 103 may be patterned to be in the vicinity of where the gate metal 110/112 extends into the trench 103 to form the gates.

Figure 16E:
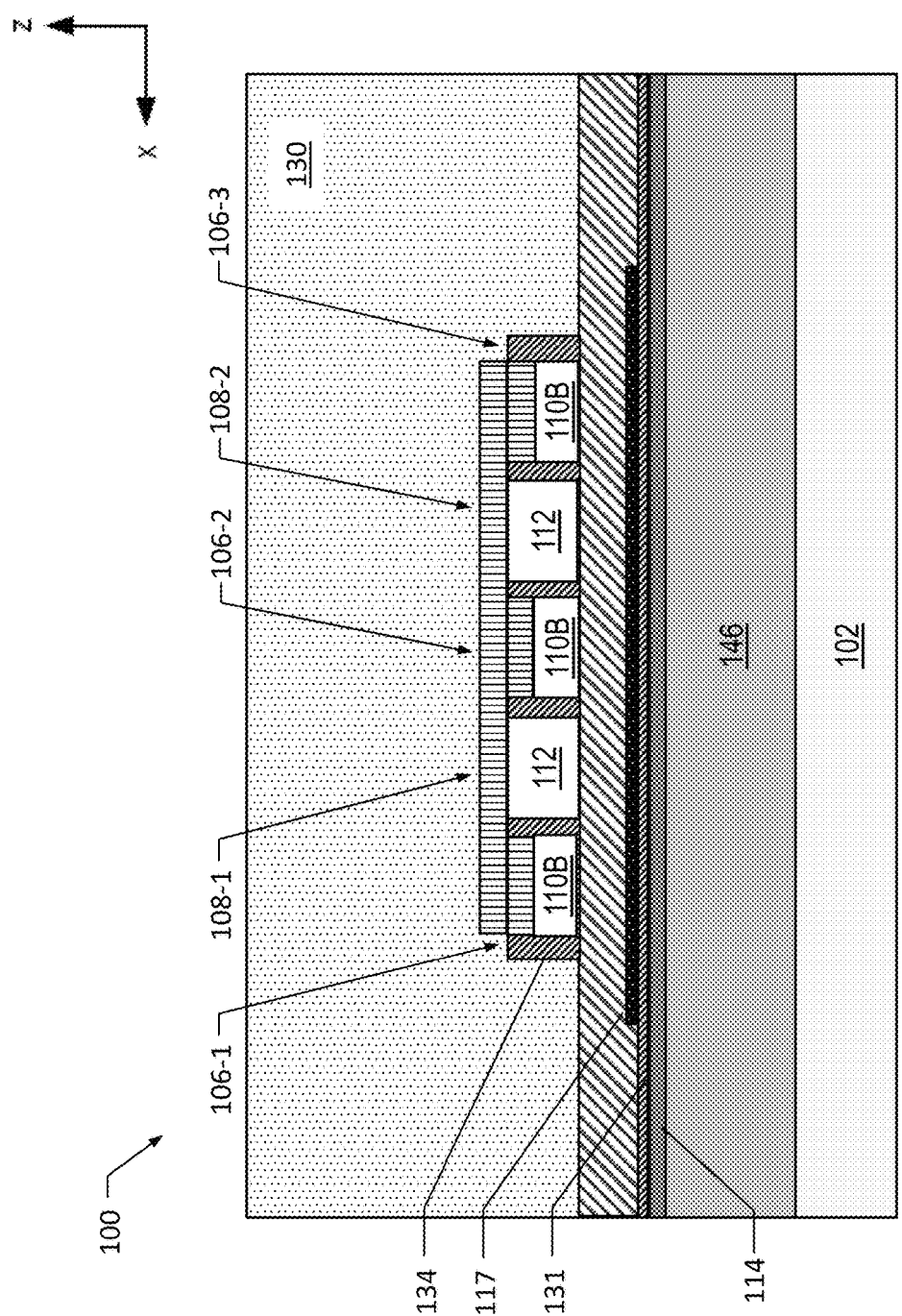

FIG. 16E illustrates a cross-sectional side view along the section E-E of FIG. 16D. Even though FIG. 16E illustrates the embodiment where the intervening material 131 is present, in other embodiments, the intervening material 131 may be absent, as described above.

Other embodiments of the quantum dot device 100 with different arrangements of the gate dielectric 114, the conductive material 117, the intervening material 131, and the dielectric material 151 in accordance with considerations described herein are possible and are within the scope of the present disclosure. The exact arrangement of these materials in terms of their presence or absence, their locations, and their dimensions may be selected for a particular design of a quantum dot device 100 based on considerations such as fabrication processes required to fabricate the device, the desired isolation between various gates, the desired control of the electrostatics in the device, complexity of routing signals to various gates and conductive liners formed by the conductive material 117, the desired accuracy of reading the states of different active quantum dots 142, etc.

As discussed above, the quantum well stack 146 may include a quantum well layer in which a 2DEG may form during operation of the quantum dot device 100. The quantum well stack 146 may take any of a number of forms, several of which are illustrated in FIGS. 17-19. The various layers in the quantum well stacks 146 discussed below may be grown on the base 102 (e.g., using epitaxial processes).

Although the singular term "layer" may be used to refer to various components of the quantum well stacks 146 of FIGS. 17-19, any of the layers discussed below may include multiple materials arranged in any suitable manner. In embodiments in which a quantum well stack 146 includes layers other than a quantum well layer 152, layers other than the quantum well layer 152 in a quantum well stack 146 may have higher threshold voltages for conduction than the quantum well layer 152 so that when the quantum well layer 152 is biased at its threshold voltages, the quantum well layer 152 conducts and the other layers of the quantum well stack 146 do not. This may avoid parallel conduction in both the quantum well layer 152 and the other layers, and thus avoid compromising the strong mobility of the quantum well layer 152 with conduction in layers having inferior mobility. In some embodiments, silicon used in a quantum well stack 146 (e.g., in a quantum well layer 152) may be grown from precursors enriched with the 28Si isotope. In some embodiments, germanium used in a quantum well stack 146 (e.g., in a quantum well layer 152) may be grown from precursors enriched with the 70Ge, 72Ge, or 74Ge isotope.

FIG. 17 is a cross-sectional view of a quantum well stack 146 including only a quantum well layer 152. The quantum well layer 152 may be disposed on the base 102, and may be formed of a material such that, during operation of the quantum dot device 100, a 2DEG may form in the quantum well layer 152 proximate to the upper surface of the quantum well layer 152. The gate dielectric 114 of the gates 106/108 may be disposed on the upper surface of the quantum well layer 152. In some embodiments, the quantum well layer 152 of FIG. 17 may be formed of intrinsic silicon, and the gate dielectric 114 may be formed of silicon oxide; in such an arrangement, during use of the quantum dot device 100, a 2DEG may form in the intrinsic silicon at the interface between the intrinsic silicon and the silicon oxide. Embodiments in which the quantum well layer 152 of FIG. 17 is formed of intrinsic silicon may be particularly advantageous for electron-type quantum dot devices 100. In some embodiments, the quantum well layer 152 of FIG. 17 may be formed of intrinsic germanium, and the gate dielectric 114 may be formed of germanium oxide; in such an arrangement, during use of the quantum dot device 100, a two-dimensional hole gas (2DHG) may form in the intrinsic germanium at the interface between the intrinsic germanium and the germanium oxide. Such embodiments may be particularly advantageous for hole-type quantum dot devices 100. In some embodiments, the quantum well layer 152 may be strained, while in other embodiments, the quantum well layer 152 may not be strained. The thicknesses (i.e., z-heights) of the layers in the quantum well stack 146 of FIG. 17 may take any suitable values. For example, in some embodiments, the thickness of the quantum well layer 152 (e.g., intrinsic silicon or germanium) may be between about 0.8 microns and 1.2 microns.

FIG. 18 is a cross-sectional view of a quantum well stack 146 including a quantum well layer 152 and a barrier layer 154. The quantum well stack 146 may be disposed on the base 102 (e.g., as discussed above with reference to FIG. 18) such that the barrier layer 154 is disposed between the quantum well layer 152 and the base 102. The barrier layer 154 may provide a potential barrier between the quantum well layer 152 and the base 102. As discussed above with reference to FIG. 17, the quantum well layer 152 of FIG. 18 may be formed of a material such that, during operation of the quantum dot device 100, a 2DEG may form in the quantum well layer 152 proximate to the upper surface of the quantum well layer 152. For example, in some embodiments in which the base 102 is formed of silicon, the quantum well layer 152 of FIG. 18 may be formed of silicon, and the barrier layer 154 may be formed of silicon germanium. The germanium content of this silicon germanium may be about 20-80% (e.g., about 30%). In some embodiments in which the quantum well layer 152 is formed of germanium, the barrier layer 154 may be formed of silicon germanium, e.g., with a germanium content of about 20-80% (e.g., about 70%). The thicknesses (i.e., z-heights) of the layers in the quantum well stack 146 of FIG. 18 may take any suitable values. For example, in some embodiments, the thickness of the barrier layer 154 (e.g., silicon germanium) may be between about 0 nanometers and 400 nanometers. In some embodiments, the thickness of the quantum well layer 152 (e.g., silicon or germanium) may be between about 5 nanometers and 30 nanometers.

FIG. 19 is a cross-sectional view of a quantum well stack 146 including a quantum well layer 152 and a barrier layer 154-1, as well as a buffer layer 176 and an additional barrier layer 154-2. The quantum well stack 146 may be disposed on the base 102 such that the buffer layer 176 is disposed between the barrier layer 154-1 and the base 102. The buffer layer 176 may be formed of the same material as the barrier layer 154, and may be present to trap defects that form in this material as it is grown on the base 102. In some embodiments, the buffer layer 176 may be grown under different conditions (e.g., deposition temperature or growth rate) from the barrier layer 154-1. In particular, the barrier layer 154-1 may be grown under conditions that achieve fewer defects than the buffer layer 176. In some embodiments in which the buffer layer 176 includes silicon germanium, the silicon germanium of the buffer layer 176 may have a germanium content that varies from the base 102 to the barrier layer 154-1; for example, the silicon germanium of the buffer layer 176 may have a germanium content that varies from zero percent at the silicon base 102 to a nonzero percent (e.g., about 30%) at the barrier layer 154-1. The thicknesses (i.e., z-heights) of the layers in the quantum well stack 146 of FIG. 19 may take any suitable values. For example, in some embodiments, the thickness of the buffer layer 176 (e.g., silicon germanium) may be between about 0.3 microns and 4 microns (e.g., between about 0.3 microns and 2 microns, or about 0.5 microns). In some embodiments, the thickness of the barrier layer 154-1 (e.g., silicon germanium) may be between about 0 nanometers and 400 nanometers. In some embodiments, the thickness of the quantum well layer 152 (e.g., silicon or germanium) may be between about 5 nanometers and 30 nanometers (e.g., about 10 nanometers). The barrier layer 154-2, like the barrier layer 154-1, may provide a potential energy barrier around the quantum well layer 152, and may take the form of any of the embodiments of the barrier layer 154-1. In some embodiments, the thickness of the barrier layer 154-2 (e.g., silicon germanium) may be between about 25 nanometers and 75 nanometers (e.g., about 32 nanometers).

As discussed above with reference to FIG. 18, the quantum well layer 152 of FIG. 19 may be formed of a material such that, during operation of the quantum dot device 100, a 2DEG may form in the quantum well layer 152 proximate to the upper surface of the quantum well layer 152. For example, in some embodiments in which the base 102 is formed of silicon, the quantum well layer 152 of FIG. 19 may be formed of silicon, and the barrier layer 154-1 and the buffer layer 176 may be formed of silicon germanium. In some such embodiments, the silicon germanium of the buffer layer 176 may have a germanium content that varies from the base 102 to the barrier layer 154-1; for example, the silicon germanium of the buffer layer 176 may have a germanium content that varies from zero percent at the silicon base 102 to a nonzero percent (e.g., about 30%) at the barrier layer 154-1. In other embodiments, the buffer layer 176 may have a germanium content about equal to the germanium content of the barrier layer 154-1 but may be thicker than the barrier layer 154-1 so as to absorb the defects that arise during growth.

In some embodiments, the quantum well layer 152 of FIG. 19 may be formed of germanium, and the buffer layer 176 and the barrier layer 154-1 may be formed of silicon germanium. In some such embodiments, the silicon germanium of the buffer layer 176 may have a germanium content that varies from the base 102 to the barrier layer 154-1; for example, the silicon germanium of the buffer layer 176 may have a germanium content that varies from zero percent at the base 102 to a nonzero percent (e.g., about 70%) at the barrier layer 154-1. The barrier layer 154-1 may in turn have a germanium content equal to the nonzero percent. In other embodiments, the buffer layer 176 may have a germanium content about equal to the germanium content of the barrier layer 154-1 but may be thicker than the barrier layer 154-1 so as to absorb the defects that arise during growth. In some embodiments of the quantum well stack 146 of FIG. 19, the buffer layer 176 and/or the barrier layer 154-2 may be omitted.

The outer spacers 134 on the outer gates 106, shown, e.g., in FIG. 2, may provide a doping boundary, limiting diffusion of the dopant from the doped regions 140 into the area under the gates 106/108. In some embodiments, the doped regions 140 may extend past the outer spacers 134 and under the outer gates 106. For example, as illustrated in FIG. 20, the doped region 140 may extend past the outer spacers 134 and under the outer gates 106 by a distance 182 between about 0 nanometers and 10 nanometers. In some embodiments, the doped regions 140 may not extend past the outer spacers 134 toward the outer gates 106, but may instead "terminate" under the outer spacers 134. For example, as illustrated in FIG. 21, the doped regions 140 may be spaced away from the interface between the outer spacers 134 and the outer gates 106 by a distance 184 between about 0 nanometers and 10 nanometers. The interface material 141 is omitted from FIGS. 8 and 9 for ease of illustration.

FIGS. 22A-22F illustrate various example stages in the manufacture of a quantum dot device, in accordance with various embodiments. Although the particular manufacturing operations discussed below with reference to FIGS. 22A-22F are illustrated as manufacturing a particular embodiment of the quantum dot device 100, these operations may be applied to manufacture many different embodiments of the quantum dot device 100, as discussed herein. Any of the elements discussed below with reference to FIGS. 22A-22F may take the form of any of the embodiments of those elements discussed above (or otherwise disclosed herein).

FIG. 22A is a perspective view of an assembly 200A including a quantum well stack 146 (the base 102 is not specifically shown in FIGS. 22A-22F) and a gate dielectric 114. The quantum well stack 146 may include a quantum well layer (not shown) in which a 2DEG may form during operation of the quantum dot device 100. Various embodiments of the quantum well stack 146 are discussed above with reference to FIGS. 17-19. The gate dielectric 114 may be provided as a materially continuous layer of a gate dielectric material and may take any of the embodiments of the gate dielectric 114 described above.

FIG. 22B is a perspective view of an assembly 200B subsequent to depositing the conductive material 117 over the assembly 200A and patterning the conductive material 117 to form two conductive liners of the conductive material 117. The conductive material 117 may be deposited and then etched away to be in a desired shape/location, using any of the techniques known in the art for patterning conductive materials.

FIG. 22C is a perspective view of an assembly 200C subsequent to depositing the insulating material 128 over the assembly 200B and patterning the insulating material 128 to form two trenches 103-1 and 103-2, as described above. The insulating material 128 may be deposited and then etched away to be in a desired shape/location, using any of the techniques known in the art for patterning insulating materials. In particular, in some embodiments, the insulating material 128 may be deposited conformal to the exposed surfaces of the assembly 200B, e.g., using a conformal deposition technique such as atomic layer deposition (ALD). The trenches 103 may then be patterned to expose the underlying gate dielectric 114 and so that the sidewalls of the lines of the conductive material 117 are still covered by the insulating material 128. In this manner, the insulating material 128 the sidewalls of the lines of the conductive material 117 may provide electrical insulation between the gate metal 110/112 of the gates 106/108 formed in the trenches 103 and the conductive liners of the conductive material 117 next to the trenches 103.

FIGS. 22D-22F illustrate a replacement metal gate (RMG) technique for forming gates 106/108, even though in other embodiments various other techniques for forming the gates 106/108 may be used as known in the art. As a part of the RMG technique, FIG. 22D illustrates an assembly 200D showing that a sacrificial material 202 is deposited over the assembly 200C, including the sacrificial material 202 being deposited in the trenches 103.

FIG. 22E illustrates an assembly 200E showing that a mark 204 may be deposited and patterned over the sacrificial material 202 of the assembly 200D, which mask 204 is then subsequently used to pattern the sacrificial material 202 to be in the shape/locations of the future gates 106/108.

FIG. 22F illustrates an assembly 200F illustrating that the patterned sacrificial material 202 of the assembly 200E is replaced with gate metals 110/112 of the gates 106/108, and that the insulating material 130 is surrounding the gates 106/108.

Quantum dot devices with conductive liners as described above may be included in any kind of quantum processing devices/structures. Some examples of such devices/structures are illustrated in FIGS. 23A-23B, 24, and 25.

FIGS. 23A-23B are top views of a wafer 1100 and dies 1102 that may be formed from the wafer 1100, according to some embodiments of the present disclosure. Dies 1102 may include any of the quantum dot devices with conductive liners of the conductive material 117 disclosed herein, e.g., the quantum dot devices 100 with conductive liners of the conductive material 117, any further embodiments of such quantum dot devices as described herein, or any combinations of such quantum dot devices. The wafer 1100 may include semiconductor material and may include one or more dies 1102 having conventional and quantum circuit device elements formed on a surface of the wafer 1100. Each of the dies 1102 may be a repeating unit of a semiconductor product that includes any suitable conventional and/or quantum circuit qubit device. After the fabrication of the semiconductor product is complete, the wafer 1100 may undergo a singulation process in which each of the dies 1102 is separated from one another to provide discrete "chips" of the semiconductor product. A die 1102 may include, or be included in, a quantum circuit component. In some embodiments, the wafer 1100 or the die 1102 may include a memory device (e.g., a static random-access memory (SRAM) device), a logic device (e.g., AND, OR, NAND, or NOR gate), or any other suitable circuit element. Multiple ones of these devices may be combined on a single die 1102. For example, a memory array formed by multiple memory devices may be formed on a same die 1102 as a processing device (e.g., the processing device 2002 of FIG. 25) or other logic that is configured to store information in the memory devices or execute instructions stored in the memory array.

Figure 24:
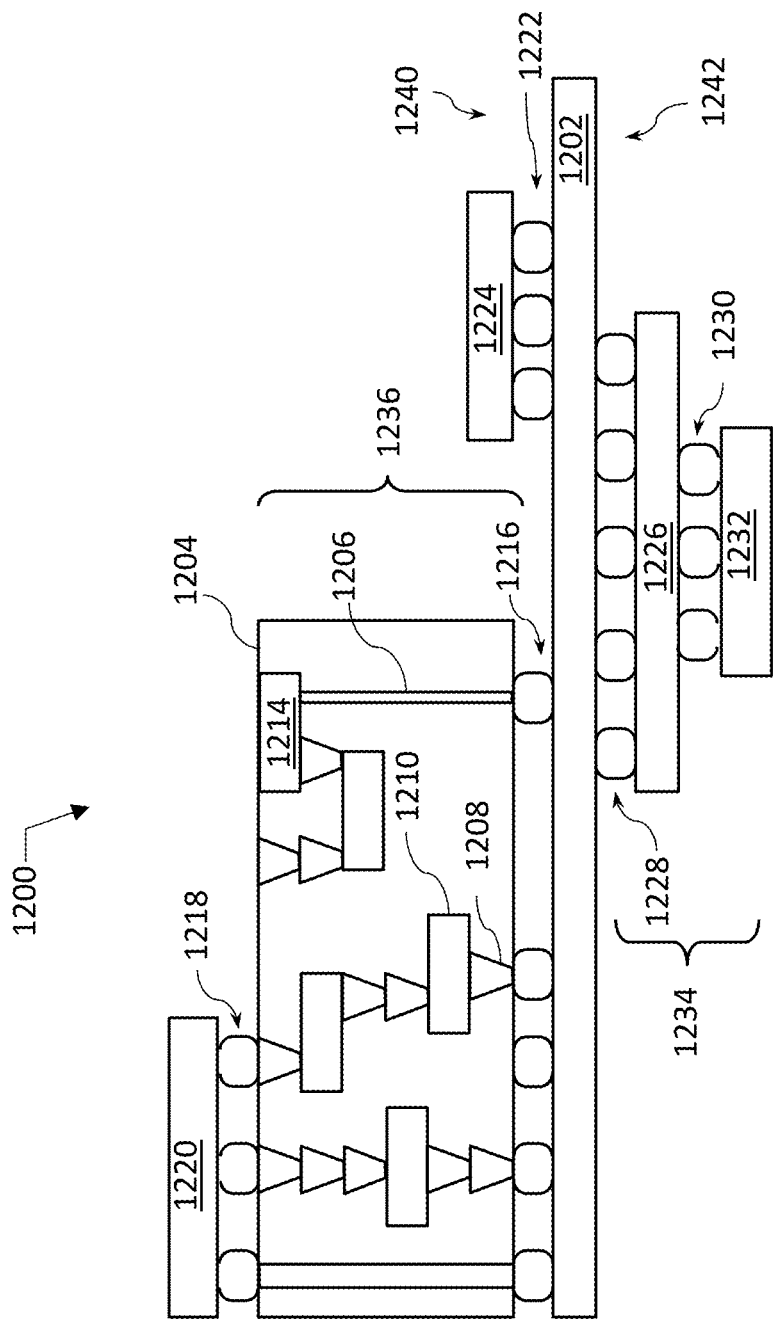
FIG. 24 is a cross-sectional side view of a device assembly that may include one or more of quantum dot devices disclosed herein.

FIG. 24 is a cross-sectional side view of a device assembly 1200 that may include any of the embodiments of the quantum dot devices with conductive liners of the conductive material 117 as disclosed herein. The device assembly 1200 includes a number of components disposed on a circuit board 1202. The device assembly 1200 may include components disposed on a first face 1240 of the circuit board 1202 and an opposing second face 1242 of the circuit board 1202; generally, components may be disposed on one or both faces 1240 and 1242.

In some embodiments, the circuit board 1202 may be a printed circuit board (PCB) including multiple metal layers separated from one another by layers of dielectric material and interconnected by electrically conductive vias. Any one or more of the metal layers may be formed in a desired circuit pattern to route electrical signals (optionally in conjunction with other metal layers) between the components coupled to the circuit board 1202. In other embodiments, the circuit board 1202 may be a package substrate or flexible board.

The IC device assembly 1200 illustrated in FIG. 24 may include a package-on-interposer structure 1236 coupled to the first face 1240 of the circuit board 1202 by coupling components 1216. The coupling components 1216 may electrically and mechanically couple the package-on-interposer structure 1236 to the circuit board 1202, and may include solder balls (as shown in FIG. 24), male and female portions of a socket, an adhesive, an underfill material, and/or any other suitable electrical and/or mechanical coupling structure.

The package-on-interposer structure 1236 may include a package 1220 coupled to an interposer 1204 by coupling components 1218. The coupling components 1218 may take any suitable form for the application, such as the forms discussed above with reference to the coupling components 1216. Although a single package 1220 is shown in FIG. 24, multiple packages may be coupled to the interposer 1204; indeed, additional interposers may be coupled to the interposer 1204. The interposer 1204 may provide an intervening substrate used to bridge the circuit board 1202 and the package 1220. The package 1220 may be a quantum circuit device package as described herein, e.g., a package including any of the quantum dot devices with conductive liners of the conductive material 117 as described herein; or may be a conventional IC package, for example. Generally, the interposer 1204 may spread a connection to a wider pitch or reroute a connection to a different connection. For example, the interposer 1204 may couple the package 1220 (e.g., a die) to a ball grid array (BGA) of the coupling components 1216 for coupling to the circuit board 1202. In the embodiment illustrated in FIG. 24, the package 1220 and the circuit board 1202 are attached to opposing sides of the interposer 1204; in other embodiments, the package 1220 and the circuit board 1202 may be attached to a same side of the interposer 1204. In some embodiments, three or more components may be interconnected by way of the interposer 1204.

The interposer 1204 may be formed of an epoxy resin, a fiberglass-reinforced epoxy resin, a ceramic material, or a polymer material such as polyimide. In some embodiments, the interposer 1204 may be formed of alternate rigid or flexible materials that may include the same materials described above for use in a semiconductor substrate, such as silicon, germanium, and other group III-V and group IV materials. The interposer 1204 may include metal interconnects 1208 and vias 1210, including but not limited to through-silicon vias (TSVs) 1206. The interposer 1204 may further include embedded devices 1214, including both passive and active devices. Such devices may include, but are not limited to, capacitors, decoupling capacitors, resistors, inductors, fuses, diodes, transformers, sensors, electrostatic discharge (ESD) devices, and memory devices. More complex devices such as radio frequency (RF) devices, power amplifiers, power management devices, antennas, arrays, sensors, and microelectromechanical systems (MEMS) devices may also be formed on the interposer 1204. The package-on-interposer structure 1236 may take the form of any of the package-on-interposer structures known in the art.

The device assembly 1200 may include a package 1224 coupled to the first face 1240 of the circuit board 1202 by coupling components 1222. The coupling components 1222 may take the form of any of the embodiments discussed above with reference to the coupling components 1216, and the package 1224 may take the form of any of the embodiments discussed above with reference to the package 1220. The package 1224 may be a package including any quantum dot devices with conductive liners of the conductive material 117 disclosed herein; or may be a conventional IC package, for example.

The device assembly 1200 illustrated in FIG. 24 includes a package-on-package structure 1234 coupled to the second face 1242 of the circuit board 1202 by coupling components 1228. The package-on-package structure 1234 may include a package 1226 and a package 1232 coupled together by coupling components 1230 such that the package 1226 is disposed between the circuit board 1202 and the package 1232. The coupling components 1228 and 1230 may take the form of any of the embodiments of the coupling components 1216 discussed above, and the packages 1226 and 1232 may take the form of any of the embodiments of the package 1220 discussed above. Each of the packages 1226 and 1232 may be a qubit device package as described herein or may be a conventional IC package, for example.

Figure 25:
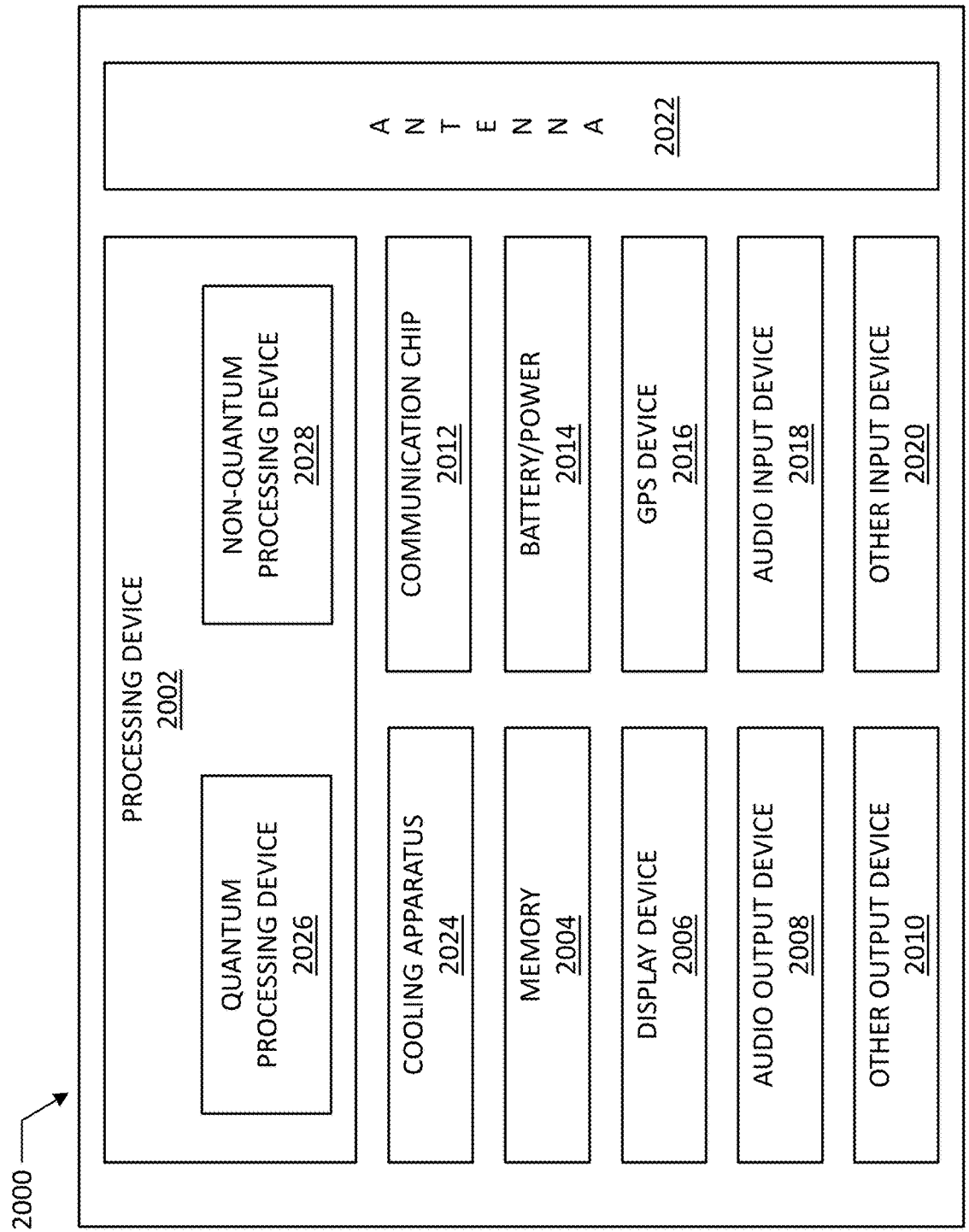
FIG. 25 is a block diagram of an example quantum computing device that may include one or more of quantum dot devices disclosed herein, in accordance with various embodiments.

FIG. 25 is a block diagram of an example quantum computing device 2000 that may include any of the quantum dot devices with conductive liners of the conductive material 117 as disclosed herein, or any combinations of such quantum dot devices. Several components are illustrated in FIG. 25 as included in the quantum computing device 2000, but any one or more of these components may be omitted or duplicated, as suitable for the application. In some embodiments, some or all of the components included in the quantum computing device 2000 may be attached to one or more PCBs (e.g., a motherboard), and may be included in, or include, any of the quantum circuits with any of the quantum dot devices with conductive liners of the conductive material 117 as described herein. In some embodiments, various ones of these components may be fabricated onto a single system-on-a-chip (SoC) die. Additionally, in various embodiments, the quantum computing device 2000 may not include one or more of the components illustrated in FIG. 25, but the quantum computing device 2000 may include interface circuitry for coupling to the one or more components. For example, the quantum computing device 2000 may not include a display device 2006, but may include display device interface circuitry (e.g., a connector and driver circuitry) to which a display device 2006 may be coupled. In another set of examples, the quantum computing device 2000 may not include an audio input device 2018 or an audio output device 2008, but may include audio input or output device interface circuitry (e.g., connectors and supporting circuitry) to which an audio input device 2018 or audio output device 2008 may be coupled.

The quantum computing device 2000 may include a cooling apparatus 2024. The cooling apparatus 2024 may maintain a quantum processing device 2026 of the quantum computing device 2000, in particular the qubit devices as described herein, at a predetermined low temperature during operation to avoid qubit decoherence and to reduce the effects of scattering in the quantum processing device 2026. In some embodiments, a non-quantum processing device 2028 of the quantum computing device 2000 (and various other components of the quantum computing device 2000) may not be cooled by the cooling apparatus 2030 and may instead operate at room temperature.

The quantum computing device 2000 may include a processing device 2002 (e.g., one or more processing devices). As used herein, the term "processing device" or "processor" may refer to any device or portion of a device that processes electronic data from registers and/or memory to transform that electronic data into other electronic data that may be stored in registers and/or memory. The processing device 2002 may include a quantum processing device 2026 (e.g., one or more quantum processing devices), and a non-quantum processing device 2028 (e.g., one or more non-quantum processing devices). The quantum processing device 2026 may include any of the quantum dot devices with conductive liners of the conductive material 117 as disclosed herein, and may perform data processing by performing operations on the qubits that may be generated in the quantum dot devices 100, and monitoring the result of those operations. For example, as discussed above, different qubits may be allowed to interact, the quantum states of different qubits may be set or transformed, and the quantum states of different qubits may be read. The quantum processing device 2026 may be a universal quantum processor, or specialized quantum processor configured to run one or more quantum algorithms. In some embodiments, the quantum processing device 2026 may execute algorithms that are particularly suitable for quantum computers, such as cryptographic algorithms that utilize prime factorization, encryption/decryption, algorithms to optimize chemical reactions, algorithms to model protein folding, etc. The quantum processing device 2026 may also include support circuitry to support the processing capability of the quantum processing device 2026, such as input/output channels, multiplexers, signal mixers, quantum amplifiers, and analog-to-digital converters.

As noted above, the processing device 2002 may include a non-quantum processing device 2028. In some embodiments, the non-quantum processing device 2028 may provide peripheral logic to support the operation of the quantum processing device 2026. For example, the non-quantum processing device 2028 may control the performance of a read operation, control the performance of a write operation, control the clearing of quantum bits, etc. The non-quantum processing device 2028 may also perform conventional computing functions to supplement the computing functions provided by the quantum processing device 2026. For example, the non-quantum processing device 2028 may interface with one or more of the other components of the quantum computing device 2000 (e.g., the communication chip 2012 discussed below, the display device 2006 discussed below, etc.) in a conventional manner, and may serve as an interface between the quantum processing device 2026 and conventional components. The non-quantum processing device 2028 may include one or more digital signal processors (DSPs), application-specific ICs (ASICs), central processing units (CPUs), graphics processing units (GPUs), cryptoprocessors (specialized processors that execute cryptographic algorithms within hardware), server processors, or any other suitable processing devices.

The quantum computing device 2000 may include a memory 2004, which may itself include one or more memory devices such as volatile memory (e.g., dynamic random-access memory (DRAM)), nonvolatile memory (e.g., read-only memory (ROM)), flash memory, solid-state memory, and/or a hard drive. In some embodiments, the states of qubits in the quantum processing device 2026 may be read and stored in the memory 2004. In some embodiments, the memory 2004 may include memory that shares a die with the non-quantum processing device 2028. This memory may be used as cache memory and may include embedded dynamic random-access memory (eDRAM) or spin transfer torque magnetic random-access memory (STT-MRAM).

In some embodiments, the quantum computing device 2000 may include a communication chip 2012 (e.g., one or more communication chips). For example, the communication chip 2012 may be configured for managing wireless communications for the transfer of data to and from the quantum computing device 2000. The term "wireless" and its derivatives may be used to describe circuits, devices, systems, methods, techniques, communications channels, etc., that may communicate data using modulated electromagnetic radiation through a nonsolid medium. The term does not imply that the associated devices do not contain any wires, although in some embodiments they might not.

The communication chip 2012 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultramobile broadband (UMB) project (also referred to as "3GPP2"), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. The communication chip 2012 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication chip 2012 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chip 2012 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication chip 2012 may operate in accordance with other wireless protocols in other embodiments. The quantum computing device 2000 may include an antenna 2022 to facilitate wireless communications and/or to receive other wireless communications (such as AM or FM radio transmissions).

In some embodiments, the communication chip 2012 may manage wired communications, such as electrical, optical, or any other suitable communication protocols (e.g., the Ethernet). As noted above, the communication chip 2012 may include multiple communication chips. For instance, a first communication chip 2012 may be dedicated to shorter-range wireless communications such as Wi-Fi or Bluetooth, and a second communication chip 2012 may be dedicated to longer-range wireless communications such as global positioning system (GPS), EDGE, GPRS, CDMA, WiMAX, LTE, EV-DO, or others. In some embodiments, a first communication chip 2012 may be dedicated to wireless communications, and a second communication chip 2012 may be dedicated to wired communications.

The quantum computing device 2000 may include battery/power circuitry 2014. The battery/power circuitry 2014 may include one or more energy storage devices (e.g., batteries or capacitors) and/or circuitry for coupling components of the quantum computing device 2000 to an energy source separate from the quantum computing device 2000 (e.g., AC line power).

The quantum computing device 2000 may include a display device 2006 (or corresponding interface circuitry, as discussed above). The display device 2006 may include any visual indicators, such as a heads-up display, a computer monitor, a projector, a touchscreen display, a liquid crystal display (LCD), a light-emitting diode display, or a flat panel display, for example.

The quantum computing device 2000 may include an audio output device 2008 (or corresponding interface circuitry, as discussed above). The audio output device 2008 may include any device that generates an audible indicator, such as speakers, headsets, or earbuds, for example.

The quantum computing device 2000 may include an audio input device 2018 (or corresponding interface circuitry, as discussed above). The audio input device 2018 may include any device that generates a signal representative of a sound, such as microphones, microphone arrays, or digital instruments (e.g., instruments having a musical instrument digital interface (MIDI) output).

The quantum computing device 2000 may include a GPS device 2016 (or corresponding interface circuitry, as discussed above). The GPS device 2016 may be in communication with a satellite-based system and may receive a location of the quantum computing device 2000, as known in the art.

The quantum computing device 2000 may include an other output device 2010 (or corresponding interface circuitry, as discussed above). Examples of the other output device 2010 may include an audio codec, a video codec, a printer, a wired or wireless transmitter for providing information to other devices, or an additional storage device.

The quantum computing device 2000 may include an other input device 2020 (or corresponding interface circuitry, as discussed above). Examples of the other input device 2020 may include an accelerometer, a gyroscope, a compass, an image capture device, a keyboard, a cursor control device such as a mouse, a stylus, a touchpad, a bar code reader, a Quick Response (QR) code reader, any sensor, or a radio frequency identification (RFID) reader.

The quantum computing device 2000, or a subset of its components, may have any appropriate form factor, such as a hand-held or mobile computing device (e.g., a cell phone, a smart phone, a mobile internet device, a music player, a tablet computer, a laptop computer, a netbook computer, an ultrabook computer, a personal digital assistant (PDA), an ultramobile personal computer, etc.), a desktop computing device, a server or other networked computing component, a printer, a scanner, a monitor, a set-top box, an entertainment control unit, a vehicle control unit, a digital camera, a digital video recorder, or a wearable computing device.

SELECT EXAMPLES

The following paragraphs provide examples of various ones of the embodiments disclosed herein.

Example 1 provides a quantum dot device that includes a quantum well layer; a first insulator material over the quantum well layer, where the first insulator material includes an opening (e.g., a trench); a gate metal on the first insulator material and extending into the opening; a conductive material proximate to the opening, between the quantum well layer and the first insulator material; and a second insulator material between the conductive material and the opening.

Example 2 provides the quantum dot device according to example 1, where the second insulator material is in contact with the conductive material.

Example 3 provides the quantum dot device according to any one of examples 1-2, where the second insulator material is in contact with a sidewall of the opening.

Example 4 provides the quantum dot device according to any one of examples 1-3, where a gate dielectric is at a bottom of the opening, between the gate metal and the quantum well layer.

Example 5 provides the quantum dot device according to example 4, where the gate dielectric is between the conductive material and the quantum well layer.

Example 6 provides the quantum dot device according to example 5, where the gate dielectric between the conductive material and the quantum well layer and the gate dielectric at the bottom of the opening are portions of a materially continuous gate dielectric structure.

Example 7 provides the quantum dot device according to any one of examples 1-6, where the conductive material is spaced apart from the opening by a distance between about 5 nanometers and 50 nanometers.

Example 8 provides the quantum dot device according to any one of examples 1-7, where a thickness of the conductive material is between about 1 nanometer and 20 nanometers.

Example 9 provides the quantum dot device according to any one of examples 1-8, where the opening is a first opening, the gate metal is a first gate metal, the first insulator material further includes a second opening (e.g., a trench), and the quantum dot device further includes a second gate metal on the first insulator material and extending into the second opening.

Example 10 provides the quantum dot device according to example 9, where the first and second openings are spaced apart by a distance between 50 and 250 nanometers.

Example 11 provides the quantum dot device according to any one of examples 9-10, where the conductive material is a first conductive material, and the quantum dot device further includes a second conductive material between the first opening and the second opening, between the quantum well layer and the first insulator material.

Example 12 provides the quantum dot device according to example 11, further including a third insulator material between the second conductive material and the first opening.

Example 13 provides the quantum dot device according to example 12, further including a fourth insulator material between the second conductive material and the second opening.

Example 14 provides the quantum dot device according to any one of examples 1-13, where the opening is a trench, and the quantum dot device further includes a further gate metal on the first insulator material and extending into the trench, and a gate spacer between the gate metal and the further gate metal in the trench.

Example 15 provides a quantum dot device that includes a quantum well layer; a first insulator material over the quantum well layer, where the first insulator material includes an opening (e.g., a trench); a gate metal on the first insulator material and extending into the opening; a second insulator material adjacent (e.g., in contact with) a sidewall of the opening; and a conductive material at a bottom of the first insulator material, the conductive material spaced apart from the sidewall of the opening by the second insulator material.

Example 16 provides the quantum dot device according to example 15, further including a gate dielectric, where a first portion of the gate dielectric is between the gate metal and the quantum well layer, a second portion of the gate dielectric is between the second insulator material and the quantum well layer, and a third portion of the gate dielectric is between the conductive material and the quantum well layer.

Example 17 provides the quantum dot device according to example 16, where the first, second, and third portions of the gate dielectric are portions of a materially continuous gate dielectric structure.

Example 18 provides a method of manufacturing a quantum dot device, the method including: providing a quantum well layer; providing a gate dielectric over the quantum well layer; providing a structure of a conductive material over the gate dielectric; providing an insulator material to bury the structure in the insulator material; forming a trench in the insulator material, the trench extending to a bottom of the insulator material and being located so that a portion of the insulator material is between a sidewall of the structure and the trench; and providing a plurality of gates in the trench.

Example 19 provides the method according to example 18, where the structure is provided using subtractive fabrication.

Example 20 provides the method according to examples 18 or 19, where the plurality of gates in the trench are separated from one another with a spacer material.

Example 21 provides a quantum computing device that includes a quantum processing device, where the quantum processing device includes a quantum dot device according to any one of the preceding examples; a non-quantum processing device, coupled to the quantum processing device, to control voltages applied to a plurality of gates of the quantum processing device; and a memory device to store data generated during operation of the quantum processing device.

Example 22 provides the quantum computing device according to example 21, further including a cooling apparatus configured to maintain the temperature of the quantum processing device below 5 degrees Kelvin.

Example 23 provides the quantum computing device according to examples 21 or 22, where the memory device is configured to store instructions for a quantum computing algorithm to be executed by the quantum processing device.

The above description of illustrated implementations of the disclosure, including what is described in the Abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize.

The invention claimed is:

1. A quantum dot device, comprising:
a quantum well layer;
a first insulator material over the quantum well layer, wherein the first insulator material includes an opening;
a gate metal having a first portion vertically stacked over the first insulator material and having a second portion extending into the opening;
a conductive material proximate to the opening, wherein the conductive material is vertically stacked between the quantum well layer and the first portion of the gate metal; and
a second insulator material between the conductive material and the opening.

2. The quantum dot device according to claim 1, wherein the second insulator material is in contact with the conductive material.

3. The quantum dot device according to claim 1, wherein the second insulator material is in contact with a sidewall of the opening.

4. The quantum dot device according to claim 1, wherein a gate dielectric is at a bottom of the opening.

5. The quantum dot device according to claim 4, wherein the gate dielectric is between the conductive material and the quantum well layer.

6. The quantum dot device according to claim 5, wherein the gate dielectric between the conductive material and the quantum well layer and the gate dielectric at the bottom of the opening are portions of a materially continuous gate dielectric structure.

7. The quantum dot device according to claim 1, wherein the conductive material is spaced apart from the opening by a distance between about 5 nanometers and 50 nanometers.

8. The quantum dot device according to claim 1, wherein a thickness of the conductive material is between about 1 nanometer and 20 nanometers.

9. The quantum dot device according to claim 1, wherein the opening is a first opening, the gate metal is a first gate metal, the first insulator material further includes a second opening, and the quantum dot device further includes:
a second gate metal on the first insulator material and extending into the second opening.

10. The quantum dot device according to claim 9, wherein the conductive material is a first conductive material, and the quantum dot device further includes:
a second conductive material between the first opening and the second opening, between the quantum well layer and the first insulator material.

11. The quantum dot device according to claim 10, further comprising:
a third insulator material between the second conductive material and the first opening.

12. The quantum dot device according to claim 11, further comprising:
a fourth insulator material between the second conductive material and the second opening.

13. The quantum dot device according to claim 1, wherein the opening is a trench, and the quantum dot device further includes:
a further gate metal on the first insulator material and extending into the trench, and
a gate spacer between the gate metal and the further gate metal in the trench.

14. A quantum dot device, comprising:
a quantum well layer;
a first insulator material over the quantum well layer, wherein the first insulator material includes an opening;
a gate metal on the first insulator material and extending into the opening;
a second insulator material adjacent a sidewall of the opening; and
a conductive material at a bottom of the first insulator material, wherein the conductive material is spaced apart from the sidewall of the opening by the second insulator material, and wherein, along a line perpendicular to the quantum well layer in a cross-section of the quantum dot device in a plane perpendicular to the quantum well layer, the conductive material is between the quantum well layer and a portion of the gate metal that is on the first insulator material.

15. The quantum dot device according to claim 14, further comprising a gate dielectric, wherein:
a first portion of the gate dielectric is between the gate metal and the quantum well layer,
a second portion of the gate dielectric is between the second insulator material and the quantum well layer, and
a third portion of the gate dielectric is between the conductive material and the quantum well layer.

16. The quantum dot device according to claim 15, wherein the first, second, and third portions of the gate dielectric are portions of a materially continuous gate dielectric structure.

17. The quantum dot device according to claim 1, wherein the second insulator material is between the conductive material and the opening along a line parallel to the quantum well layer in a cross-section of the quantum dot device in a plane perpendicular to the quantum well layer.

18. The quantum dot device according to claim 1, further comprising a dielectric material vertically stacked over the quantum well layer, wherein the conductive material is vertically stacked between the dielectric material and the first portion of the gate metal.

19. The quantum dot device according to claim 18, wherein the dielectric material is a high-k dielectric material.

20. A quantum dot device, comprising:
   a quantum well layer;
   a first insulator material over the quantum well layer, wherein the first insulator material includes an opening;
   a gate metal on the first insulator material and extending into the opening;
   a conductive material proximate to the opening, between the quantum well layer and the first insulator material; and
   a second insulator material between the conductive material and the opening along a line parallel to the quantum well layer in a cross-section of the quantum dot device in a plane perpendicular to the quantum well layer.

21. The quantum dot device according to claim 20, wherein:
   the gate metal has a first portion vertically stacked over the first insulator material and has a second portion extending into the opening, and
   the conductive material is between the quantum well layer and the first portion of the gate metal.

22. The quantum dot device according to claim 21, wherein the conductive material is between the quantum well layer and the first portion of the gate metal along a line perpendicular to the quantum well layer in a cross-section of the quantum dot device in a plane perpendicular to the quantum well layer.

23. The quantum dot device according to claim 20, wherein the conductive material is between the quantum well layer and the first insulator material along a line perpendicular to the quantum well layer in a cross-section of the quantum dot device in a plane perpendicular to the quantum well layer.

* * * * *